United States Patent
Boyd et al.

(10) Patent No.: US 11,446,590 B2
(45) Date of Patent: *Sep. 20, 2022

(54) METHODS FOR CLEANING FILTRATION SYSTEM MEDIA

(71) Applicant: Parkson Corporation, Fort Lauderdale, FL (US)

(72) Inventors: Howard Carmichael Boyd, Homewood, AL (US); William Frederick Foreman, III, Hoover, AL (US)

(73) Assignee: PARKSON CORPORATION, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,537

(22) Filed: Dec. 14, 2020

(65) Prior Publication Data

US 2021/0093986 A1    Apr. 1, 2021

Related U.S. Application Data

(63) Continuation of application No. 16/077,631, filed as application No. PCT/US2017/023258 on Mar. 20, 2017, now Pat. No. 10,864,465.

(Continued)

(51) Int. Cl.
*B01D 24/46* (2006.01)
*C02F 1/00* (2006.01)
(Continued)

(52) U.S. Cl.
CPC ....... *B01D 24/4626* (2013.01); *B01D 24/167* (2013.01); *B01D 24/4621* (2013.01);
(Continued)

(58) Field of Classification Search
None
See application file for complete search history.

(56) References Cited

U.S. PATENT DOCUMENTS

| 515,769 A | 3/1894 | Harris |
|---|---|---|
| 620,621 A | 3/1899 | Veazie |

(Continued)

FOREIGN PATENT DOCUMENTS

| CA | 2891856 A1 | 7/2015 |
|---|---|---|
| GB | 2080694 A | 2/1982 |
| GB | 2189712 A | 11/1987 |

OTHER PUBLICATIONS

International Search Report and Written Opinion for international patent application serial No. PCT/US17/23258.

(Continued)

*Primary Examiner* — Robert J Popovics
(74) *Attorney, Agent, or Firm* — Stephen H. Hall; Bradley Arant Boult Cummings LLP

(57) ABSTRACT

The present disclosure provides improved methods for conducting a wash cycle in a filtration unit. The methods may be used alone or in combination with one another to achieve the improvements described herein. Filtration units adapted for carrying out the novel methods are also provided. Through the use of the methods and filtration units described, significant economic benefits are obtained without a significant increase in the costs of the filtration unit or in the costs of operation of the filtration unit.

20 Claims, 13 Drawing Sheets

Related U.S. Application Data

(60) Provisional application No. 62/310,376, filed on Mar. 18, 2016.

(51) Int. Cl.
  *B01D 24/16* (2006.01)
  *B01D 24/14* (2006.01)

(52) U.S. Cl.
  CPC .............. *C02F 1/004* (2013.01); *B01D 24/14* (2013.01); *B01D 2024/162* (2013.01); *C02F 2303/16* (2013.01)

(56) References Cited

U.S. PATENT DOCUMENTS

| | | |
|---|---|---|
| 3,122,594 A | 2/1964 | Kielback |
| 3,219,194 A | 11/1965 | Schwartzwalder et al. |
| 3,374,052 A | 3/1968 | Fan et al. |
| 3,374,896 A | 3/1968 | Palmer et al. |
| 3,412,863 A | 11/1968 | Stuart, Sr. |
| 3,680,701 A | 8/1972 | Holca |
| 3,698,554 A | 10/1972 | Mail |
| 3,747,769 A | 7/1973 | Brumfield |
| 3,826,375 A | 7/1974 | Fournier |
| 3,869,381 A | 3/1975 | Graveland |
| 4,115,266 A | 9/1978 | Ohshima |
| 4,122,011 A | 10/1978 | Strigle, Jr. |
| 4,125,467 A | 11/1978 | Haddad et al. |
| 4,139,473 A | 2/1979 | Alldredge |
| 4,157,959 A | 6/1979 | Wen et al. |
| 4,191,652 A | 3/1980 | Whitmore |
| 4,198,301 A | 4/1980 | Iwatani |
| 4,253,947 A | 3/1981 | Fan et al. |
| 4,322,296 A | 3/1982 | Fan et al. |
| 4,350,590 A | 9/1982 | Robinson |
| 4,420,403 A | 12/1983 | Tufts |
| 4,438,000 A | 3/1984 | Fan et al. |
| 4,446,027 A | 5/1984 | Simmers |
| 4,487,727 A | 12/1984 | Ballato, Jr. |
| 4,547,286 A | 10/1985 | Hsiung |
| 4,582,600 A | 4/1986 | Atkinson et al. |
| 4,601,825 A | 7/1986 | Eriksson |
| 4,608,181 A | 8/1986 | Hsiung et al. |
| 4,624,789 A | 11/1986 | Fan et al. |
| 4,627,923 A | 12/1986 | Ross |
| 4,640,781 A | 2/1987 | Hughes |
| 4,776,962 A | 10/1988 | Wakeman |
| 4,793,934 A | 12/1988 | Thompson et al. |
| 4,865,734 A | 9/1989 | Schulz |
| 4,885,083 A | 12/1989 | Banks |
| 4,963,257 A | 10/1990 | Schulz |
| 4,971,688 A | 11/1990 | Francois et al. |
| 5,030,353 A | 7/1991 | Stuth |
| 5,087,354 A | 2/1992 | Montagnon |
| 5,126,042 A | 6/1992 | Malone |
| 5,145,589 A | 9/1992 | Okubo et al. |
| 5,200,081 A | 4/1993 | Stuth |
| 5,202,027 A | 4/1993 | Stuth |
| 5,217,616 A | 6/1993 | Sanyal et al. |
| 5,227,051 A | 7/1993 | Oshima |
| 5,229,015 A | 7/1993 | Keep et al. |
| 5,232,586 A | 8/1993 | Malone |
| 5,248,415 A | 9/1993 | Masuda et al. |
| 5,407,574 A | 4/1995 | Hensley |
| 5,401,405 A | 5/1995 | McDougald |
| 5,429,740 A | 7/1995 | Van Der Herberg |
| 5,445,740 A | 8/1995 | Malone |
| 5,573,663 A | 11/1996 | Junius et al. |
| 5,578,202 A | 11/1996 | Hirane |
| 5,618,431 A | 4/1997 | Kondo et al. |
| 5,750,041 A | 5/1998 | Hirane |
| 5,766,488 A | 6/1998 | Uban et al. |
| 5,770,080 A | 6/1998 | Malone |
| 5,932,092 A | 8/1999 | Hawk et al. |
| 5,945,005 A | 8/1999 | Junius et al. |
| 6,015,497 A | 1/2000 | Steen, Jr. |
| 6,063,268 A | 5/2000 | Jowett |
| 6,110,389 A | 8/2000 | Horowitz |
| 6,171,480 B1 | 1/2001 | Lee et al. |
| 6,423,216 B1 | 7/2002 | Yum et al. |
| 6,428,690 B1 | 8/2002 | Tse |
| 6,517,724 B1 | 2/2003 | Malone |
| 6,605,216 B1 | 8/2003 | Lederman |
| 6,682,653 B2 | 1/2004 | Chuang et al. |
| 6,790,347 B2 | 9/2004 | Jeong et al. |
| 7,223,347 B2 | 5/2007 | Boner et al. |
| 7,270,745 B2 | 9/2007 | Schwartzkopf |
| 7,374,676 B2 | 5/2008 | Dew, Jr. |
| 7,435,351 B2 | 10/2008 | Boner et al. |
| 7,572,383 B2 | 8/2009 | Dew, Jr. |
| 7,670,489 B2 | 3/2010 | Torrijos et al. |
| 9,149,746 B2 | 10/2015 | Choi |
| 9,440,864 B2 | 9/2016 | Woo |
| 9,718,004 B2 | 8/2017 | Fujita et al. |
| 10,238,997 B2 | 3/2019 | Malone |
| 10,407,317 B2 | 9/2019 | Miyata et al. |
| 10,744,429 B2 | 8/2020 | Oz et al. |
| 10,864,465 B2 * | 12/2020 | Boyd ................. B01D 24/4626 |
| 10,913,667 B2 * | 2/2021 | St. Germain ........... C02F 1/004 |
| 2003/0111431 A1 | 6/2003 | Dew, Jr. |
| 2004/0140256 A1 | 7/2004 | Dew, Jr. |
| 2005/0029204 A1 | 2/2005 | Schwartzkopf |
| 2005/0127011 A1 | 6/2005 | Schwartzkopf |
| 2005/0211644 A1 | 9/2005 | Goldman |
| 2008/0245743 A1 | 10/2008 | Dew |
| 2008/0257804 A1 | 10/2008 | Dew |
| 2008/0257805 A1 | 10/2008 | Dew |
| 2012/0211430 A1 | 8/2012 | Choi |
| 2013/0168307 A1 | 7/2013 | Drivarbekk et al. |
| 2014/0291224 A1 | 10/2014 | Fujita et al. |
| 2015/0190738 A1 | 7/2015 | Bosisio et al. |
| 2015/0343336 A1 | 12/2015 | Pett |
| 2016/0220930 A1 | 8/2016 | Oz et al. |
| 2016/0250571 A1 | 9/2016 | Bloomfield |
| 2016/0340209 A1 * | 11/2016 | Kashihara ............... C02F 1/004 |
| 2019/0039001 A1 | 2/2019 | Le Roux |
| 2019/0046901 A1 * | 2/2019 | Boyd ................. B01D 24/4621 |
| 2019/0177181 A1 | 6/2019 | St. Germain et al. |
| 2020/0179829 A1 * | 6/2020 | Friend ..................... C02F 1/004 |
| 2021/0093986 A1 * | 4/2021 | Boyd ................... B01D 24/167 |

OTHER PUBLICATIONS

Extended European Search Report for European application serial No. 17767710.1 dated Oct. 15, 2019.

* cited by examiner

METHODS FOR CLEANING FILTRATION SYSTEM MEDIA

CROSS-REFERENCE TO RELATED APPLICATIONS

This application is a continuation of, and claims priority to, and the benefit of, U.S. application Ser. No. 16/077,631 titled "Improved Methods for Cleaning Filtration System Media," filed Aug. 13, 2018 (now U.S. Pat. No. 10,864,465), which claims the benefit of and priority to the earlier-filed PCT Application No. PCT/US2017/023258, filed on Mar. 20, 2017, published as WO2017/161381 on Sep. 21, 2017, and U.S. provisional application (62/310,376) filed on Mar. 18, 2016, the entire contents of which are hereby incorporated by reference.

FIELD OF THE DISCLOSURE

The present disclosure relates generally to improved methods for cleaning filtration media. More particularly, the present disclosure relates to improved methods for cleaning filtration media used in filtration systems, including filtration systems used in connection with the treatment of wastewater for reduction of suspended solids.

BACKGROUND OF THE DISCLOSURE

Disposal and reuse of wastewater is problematic. Stringent wastewater treatment requirements have been promulgated to protect human health, particularly in those areas having limited water supply or dense populations. For example, Title 22 of the California Administrative Code establishes stringent water reuse criteria where human contact is likely to occur with treated wastewater.

For a variety of reasons, porous filtration media is commonly used in fluid treatment. However, the use of granular filtration is not without drawbacks and can be the limiting factor from a filtration capacity standpoint for a fluid treatment system. Porous filtration media includes porous solids, such as sand, gravel and anthracite coal, as well as synthetic porous filtration media.

Synthetic porous filtration media are increasingly being used in wastewater filtration applications. One type of synthetic porous filtration media that has been used by the applicants of the present disclosure is described in U.S. Pat. No. 7,374,676. Such media comprises a plurality of crimped fibrous lumps that are capable of being compressed in order to adjust the porosity and the size of the particles that are trapped or captured by the fibrous lumps. Such media are referred to herein as "compressible filtration media." In operation of a filtration system comprising the compressible filtration media, the compressible filtration media is compressed to define a porosity gradient in the filter media bed proceeding progressively from more porous to less porous in the direction of the flow of the influent fluid so that filtration proceeds in a direction from a more porous to a less porous filter media bed and passing an influent fluid containing particles through the filter media bed. In such operation, the larger particles are initially retained or captured in the portion of the filter media bed where the compressible filtration media have the largest pore size and smaller particles are retained or captured later in the portion of the filter media bed where the compressible media filter has smaller pore size.

Regardless of the type of porous filtration media used, the filtration media is required to be cleaned periodically to remove captured solids. This cleaning process is referred to as backwashing, which entails using a washing fluid to agitate the filtration media and allow for the accumulated solids to be removed. In such backwashing operations it is important to minimize the amount of washing fluid in the process as such washing fluid will have to be subject to treatment or otherwise disposed of and to minimize the amount of time spend during the backwashing process in order to maximize the efficiency of the filtration unit. Furthermore, it is desirable to eliminate or minimize the use of chemical cleaning agents during the backwashing process due to the expense of the chemicals and the potential need for separate disposal of the washing fluid exposed to the chemical cleaning agents. Finally, it is desirable to remove as much of the accumulated solids from the filtration media as possible during the backwashing operation in order to minimize the time in between subsequent backwashing operations. In operation, the frequency and duration of backwashing operations may depend on the type of porous filtration media used, the solids content and particle size distribution of the fluid being treated and operation parameters of the filtration system (for example, the flow rate of the fluid being subject to filtration).

While methods exist to clean porous filtration media, the art is in need of improved methods for cleaning porous filtration media that result in at least one of the following: i) minimizing the amount of washing fluid used in the cleaning process; ii) reduce the amount of time required for the cleaning process; iii) provide increased time between each wash cycle while maintaining fluid filtration above a minimum acceptable level; iv) eliminating the requirement for chemical cleaning agents to be used during the cleaning process; v) to increase the life of the filtration media; and vi) to maximize removal of the captured particles from the filtration media during each wash cycle. Such needs are especially applicable to synthetic porous filtration media such as compressible media filters.

The present disclosure provides a solution to the problems of cleaning porous filtration media, particularly synthetic porous filtration media, such as compressible filtration media, by providing improved methods for cleaning porous filtration media and filtration units comprising components designed to carry out such methods.

DETAILED DESCRIPTION

Definitions

Figure 1:
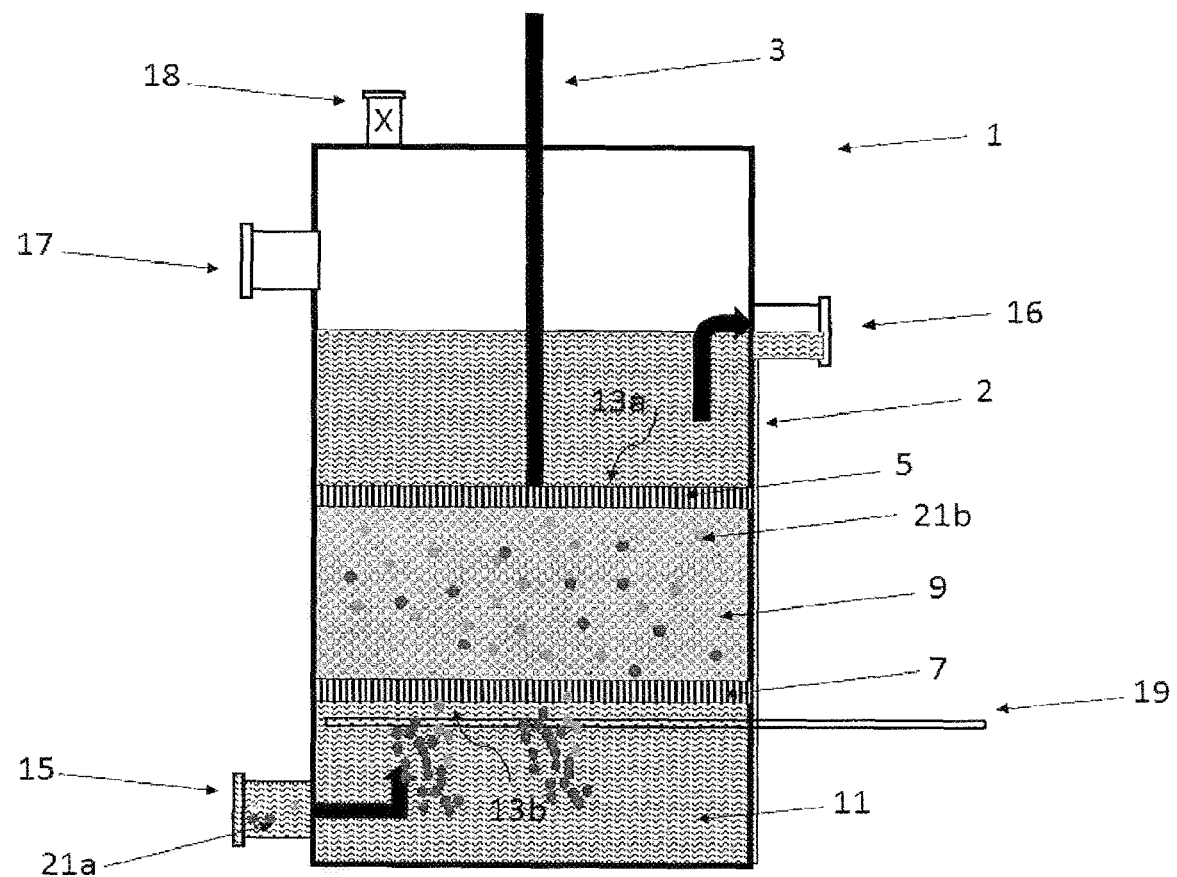
FIG. 1 shows a schematic of a prior art device for fluid filtration using compressible filtration media during the filtration process.

As used herein, the term "fluid" refers to a substance that has no fixed shape and yields easily to external pressure, such as a gas or a liquid.

As used herein, the term "scouring fluid" refers to a fluid having the appropriate physical characteristics, such as density and buoyancy, relative to the characteristics of the particle removal fluid (as defined below), such that when the scouring fluid has a positive buoyancy in the particle removal fluid and provides a motive force sufficient to produce agitative motion of filtration media in a filter media bed during the wash cycle of a filtration device; in a preferred embodiment, the scouring fluid is a gas, such as, but not limited to, compressed air.

As used herein, the term "particle removal fluid" refers to a fluid that has the appropriate physical characteristics to serve as the transportation medium to remove the contaminant particles dislodged or loosened from filtration media during a wash cycle of a filtration unit; in a preferred embodiment, the fluid is a liquid.

As used herein, the term "transition zone" refers to an area that is created only during the wash cycle where there is no clearly defined interface or boundary between the scouring fluid and the particle removal fluid and which is created, at least in part, by the energy of the scouring fluid exiting the bulk particle removal fluid.

As used herein, the term "transition plenum" refers to the area of the transition zone that is created below the level of the upper place in a filtration unit during a wash cycle.

As used herein, the term "porous filtration media" refers to filtration media that contains pores or capture points that are capable of trapping particulates contained in a fluid stream within the pores or capture points when the fluid stream is passed through a filter media bed containing the filtration media.

As used herein, the term "synthetic porous filtration media" refers to filtration media that is manufactured from synthetic components, such as but not limited to synthetic fibers, and contains pores or capture points that are capable of trapping particulates contained in a fluid stream within the pores or capture points when the fluid stream is passed through a filter media bed containing the filtration media.

As used herein, the term "compressible filtration media" refers to synthetic porous filtration media, wherein the filtration media form a porosity gradient in the filter media bed when a compression force is applied to the filtration media, wherein the porosity gradient is least porous at the point of application of the compressive force and becomes progressively more porous as the distance from the compressive force increases.

Introduction

The basic goal of filtration, whether for gasses or liquids, is to remove contaminant particles in an influent stream to produce an effluent stream that contains a reduced number or concentration of the contaminant particles. The contaminant particles in the influent stream are said to be "captured" when they are trapped by the filtration media and removed from the influent stream, producing an effluent stream that has a reduced number of contaminant particles. Over time, the filtration media as a result of the capture of the contaminant particles in the influent stream fails to filter further contaminant particles effectively and is said to be full. Therefore, the filtration media requires periodic cleaning to remove the captured contaminant particles from the filtration media. The type of influent stream, the volumetric flow rate of the influent stream, the amount of contaminant particles in the influent stream and the size/composition of the contaminant particles in the influent stream are factors in determining how often the filtration media need to be cleaned. Therefore, when describing the filtration of fluids, the filtration process can be described as having two basic phases, a filtration cycle to remove contaminant particles from the influent stream to be filtered or treated and a washing cycle to remove the trapped contaminant particles to clean or regenerate the filtration media.

The important parameters for the filtration cycle are: i) the percentages of contaminant particles removed from the influent stream; and ii) the particle size of the contaminant particles that can be removed from the influent stream. The higher the percentage of removal of the contaminant particles and the smaller the size of the contaminant particles removed from the influent stream, the better the performance of the filtration unit. The important parameters for the wash cycle are: i) the completeness of the wash in terms of how much of the trapped contaminant particles are removed; ii) the time required for the wash cycle; and iii) the volume of washing fluid, which is referred to herein as particle removal fluid, required to be used during the wash cycle. The more complete the removal of the captured contaminant particles from the filtration media, the better the performance of the wash cycle. When a higher percentage of the contaminant particles are removed from the filtration media during the wash cycle, the filtration media functions more efficiently and increases the time to the next wash cycle, increasing the efficiency and cost-effectiveness of the filtration unit. Furthermore, the shorter the duration of the wash cycle the better as the filtration unit is off-line for less periods of time. Any time spent in the wash cycle, reduces the time the filtration unit can be in operation, which can lead to decreased volumes of influent that can be filtered and/or the need for additional filtration units, each of which increases the cost of operation and decreases cost-effectiveness. Finally, the less volume of particle removal fluid used the better as the particle removal fluid used in the wash cycle will ultimately be subject to subsequent reprocessing, filtration or disposal. In many systems, the particle removal fluid used in the wash cycle is recycled to the head of the plant and, thus, adds to the volume of influent that must be filtered. In other systems, the particle removal fluid used in the wash cycle requires separate disposal. Therefore, wash cycles that use less particle removal fluid increase the cost-effectiveness of the filtration unit.

The present disclosure provides improved methods of increasing the efficiency of the wash cycle. The methods disclosed may be used with any type of porous filtration media, particularly synthetic porous filtration media and more particularly compressible filtration media. The present disclosure also provides improved filtration units adapted to carry out such methods. The methods and filtration units of the present disclosure are exemplified using compressible filtration media, however other types of porous filtration media may be used with the methods and filtration units of the present disclosure.

The present disclosure provides two methods of conducting a wash cycle for use in a filtration device, such as, but not limited to, a filtration device comprising a filter bed comprising porous filtration media units. Such methods in one embodiment increase the efficiency of the wash cycle. The two methods are referred to as a directed scouring fluid method and a transition plenum method. The methods may be used alone or in combination with one another to achieve the results and/or improvements described herein. In certain embodiments, the increased efficiency of the wash cycle results in at least one of the following: i) an improved degree of cleaning of porous filtration media, specifically including compressible filtration media; ii) a higher percentage of removal of trapped contaminant particles from the porous filtration media, specifically including compressible filtration media; iii) a decreased wash cycle time; iv) a reduced amount of particle removal fluid required to be used during a wash cycle; v) an increased interval between wash cycles; and iv) an increase in the interval of time between cleaning with the aid of chemical additive cleaning agents. The foregoing benefits, in certain instances, may be made in comparison to wash cycles using the methods of the prior art. An exemplary filtration unit using a wash cycle of the prior art is disclosed herein. Therefore, the present disclosure provides improved methods for conducting a wash cycle for use in cleaning porous filtration media, particularly including synthetic porous filtration media and compressible filtration media, as well as improved filtration units configured to carry out such methods. As a result, significant economic benefits are obtained without a significant increase in the costs of the filtration unit or in the costs of operation of the filtration unit.

Description of Prior Art Device

A prior art filtration unit for use in fluid filtration is shown in FIG. 1. The filtration unit 1 comprises a housing 2, a plate actuator 3, an upper moveable plate 5 containing a plurality of perforations 13a, a bottom plate 7 containing a plurality of perforations 13b, filter media bed 9 comprising the compressible filtration media, an influent pipe 15, an effluent pipe 17 for the particle removal fluid (PRF), an effluent pipe 16 for the filtered effluent and a scouring fluid inlet pipe 19. The filter media bed 9 contains a plurality of compressible filtration media contained by the housing 2 and the upper 5 and lower 7 plates which contain perforations (13a and 13b, respectively) to allow the fluid to flow through while still retaining the compressible filtration media in the filter media bed 9. The upper plate 5 is lowered by plate actuator 3 to compress the filter media bed 9. The influent pipe 15 introduces an influent fluid 11 (for example water) to be filtered; the fluid contains contaminant particles 21 to be filtered and removed from the influent fluid 11. The fluid 11 passes through the filter media bed 9 and exits the unit 1 through the effluent pipe 16. The contaminant particles 21a are retained or captured by the compressible filtration media in the filter media bed 9. As discussed above, the compression results in a porosity gradient in the filter media bed 9 proceeding progressively from more porous to less porous in the direction of the flow of the influent fluid to be filtered so that filtration proceeds in a direction from a more porous to a less porous filter media bed 9. In such operation, the larger particles are initially retained or captured in the portion of the filter media bed 9 where the compressible filtration media have the largest pore size and smaller particles are retained or captured later in the portion of the filter media bed 9 where the compressible media filter has smaller pore size. The filtration unit 1 operates in this manner until the compressible filtration media is in need of cleaning.

Figure 2A:
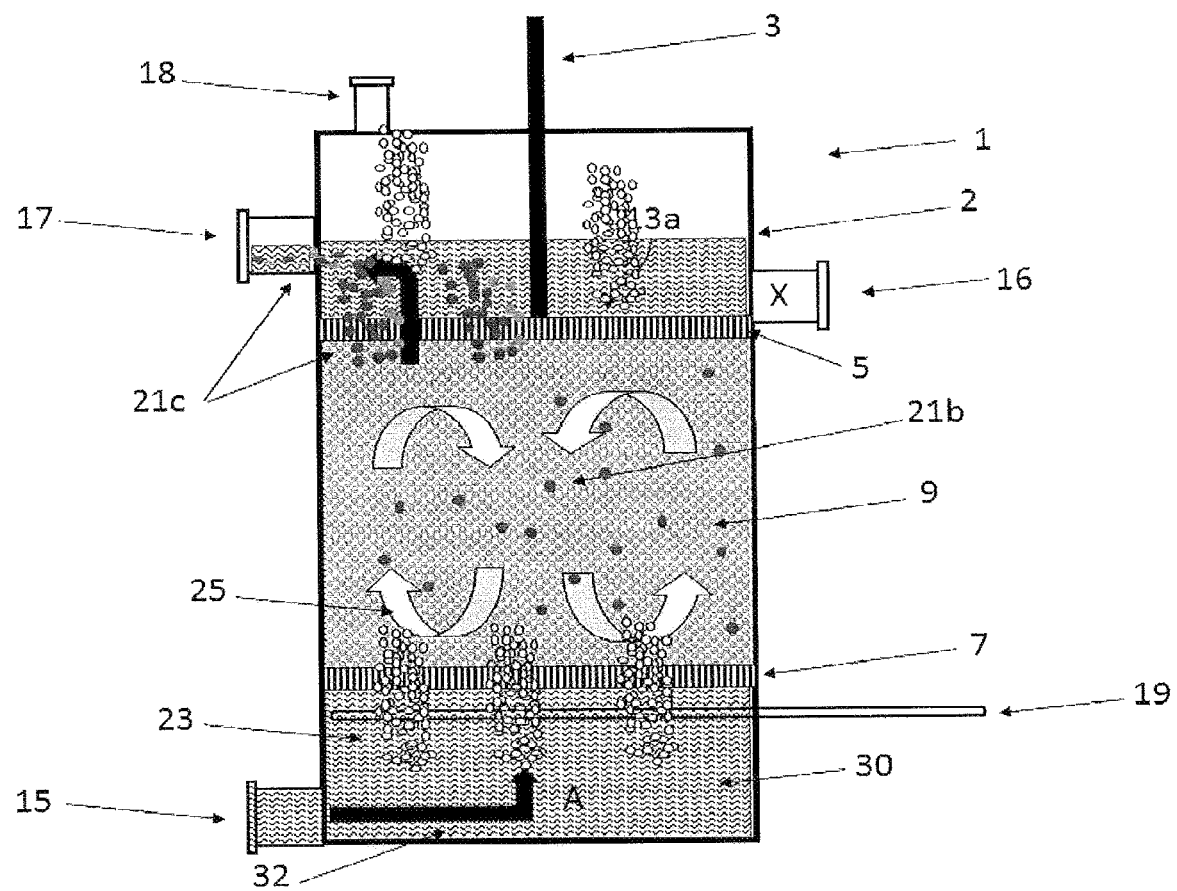
FIG. 2A shows a schematic of a prior art device for fluid filtration using compressible filtration media during the washing process.

FIG. 2A shows the wash cycle in the prior art device of FIG. 1. In operation the upper plate 5 is moved upward to provide an expanded filter media bed 9. When the filter media bed 9 has been expanded, a scouring fluid 23 (SF; for example air) is released under the media bed through scouring fluid inlet pipe 19 and a particle removal fluid 30 (PRF; for example water) is introduced through influent pipe 15. The typical flow rates for the SF 23 range from a low of 10 cubic feet per minute per square foot of media (as measured cross sectional to the direct of flow) to a high of 20 cubic feet per minute per square foot of media. The typical flow rates for the PRF range from a low of 10 gallons per min per square foot of media (as measured cross sectional to the direction of flow) to a high rate of 40 gallons per minute per square of media. In the prior art device, the SF 23 is pressurized air (for example delivered at around 8 lbs pressure). As the SF 23 rises into the filter media bed 9 due to buoyancy forces, it passes through the perforations 13b in the lower plate 7 and induces an agitative motion to the compressible filtration media in the expanded filter media bed 9. This agitative motion, exemplified by the arrows 25, creates collisions between individual compressible filtration media with one another and with the housing 2 and other components of the unit 1. These collisions cause the captured contaminant particles 21b to be released from the compressible filtration media yielding released contaminant particles 21c which are carried by the PRF 30 away from the expanded filter media bed 9 and exit the unit 1 through effluent pipe 17. In the prior art device, the wash cycle lasts for 24 minutes. Following completion of the wash cycle, the system is purged for an additional 6 minutes to push the PRF with the release contaminant particles 21c completely out of the filtration unit.

Figure 2B:
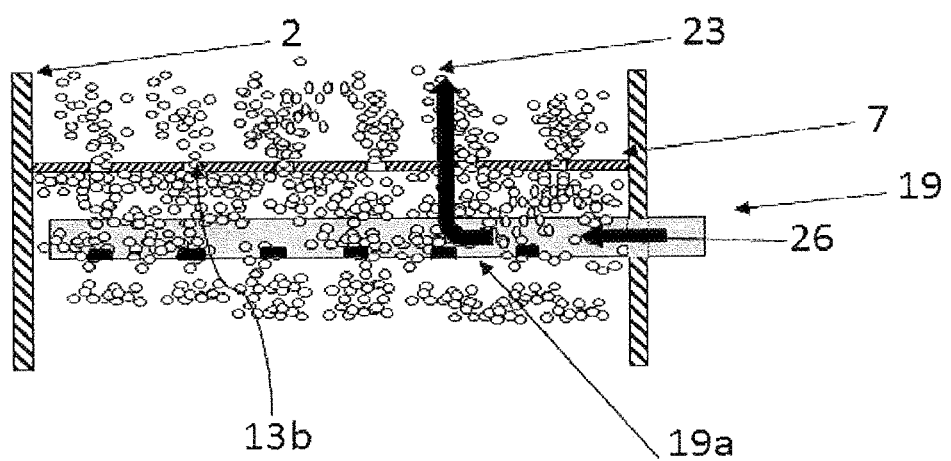
FIG. 2B shows a detailed view of the structure involved in the washing process using the prior art device.

FIG. 2B shows a detailed view of the scouring fluid inlet pipe 19, illustrating the flow of the SF 23 (arrows 26) through the scouring fluid pipe 19 and the release of the SF 23 through exit channels 19a disposed on the bottom portion of the scouring fluid inlet pipe 19 (the portion of the pipe farthest away from bottom plate 7). As can be seen, the SF 23 is initially directed downwards away from the expanded filter media bed 9, dissipating a substantial portion of the motive force of the SF 23. As the bottom portion of the unit is filled with the PRF 30, buoyant force causes the SF 23 to rise and to pass through perforations 13b in lower plate 7 to agitate the expanded filter media bed 9 (not shown in FIG. 2B).

However, due to the loss of energy/motive force in the SF 23, the induced agitation is not sufficient to remove all of the contaminant particles 21b captured by the compressible filtration media. As a result, the compressible filtration media retain a portion of the contaminant particles 21b even after completion of the wash cycle. This portion increases over time. In the prior art device described, it is estimated that 10 to 30% of the contaminant particles 21b are retained. As such, over time the compressible filtration media cease to function efficiently and requires restorative cleaning involving chemical additives (such as detergents and the like) or replacement. Either of the options above require the filter unit to be off line for an extended period of time decreasing the amount of fluid filtered by the unit and increasing the costs of operation.

A more efficient wash cycle would alleviate these problems. Therefore, a method for increasing the efficiency of a wash cycle and filtration unit adapted to implement such methods are needed that achieve at least one of the following: i) an improved degree of cleaning of porous filtration media, specifically including compressible filtration media; ii) a higher percentage of removal of trapped contaminant particles from the porous filtration media, specifically including compressible filtration media; iii) a decreased wash cycle time; iv) a reduced amount of particle removal fluid required to be used during a wash cycle; v) an increased interval between wash cycles; and iv) an increase in the interval of time between cleaning with the aid of chemical additive cleaning agents.

Methods and Filtration Unit for Increasing the Efficiency of a Wash Cycle

The present disclosure provides for an improved filtration unit incorporating one or both of a directed scouring fluid and/or a transition plenum method. The operation of each is described below.

Directed Scouring Fluid

In a first embodiment, a directed scouring fluid method is described for improving a wash cycle as well as an improved filtration unit incorporating the direct scouring fluid improvement (FIGS. 3A to 3F). The method is described in conjunction with the features of the improved filtration unit for simplicity. This example is not meant to limit the application of the directed scouring fluid method to the embodiment of the filtration unit incorporating the directed scouring improvement described herein. The method may also be incorporated into other filtration units and this description is not intended to be limiting. The scouring fluid inlet pipes as described herein may be used independently of the particular filtration device described herein and are a particular improvement that can be used independently of the particular filtration device described herein. For example, and without limitation, the directed scouring fluid method may be used in filtration devices where the upper plate 105 is in a fixed position, where the lower plate 107 is moveable, where both the upper 105 and lower 103 plates are fixed or where the filtration unit only comprises an upper plate 105. As used herein the term "plate" when referring to the upper and lower plates means an element capable of containing the porous filtration media and is not limited to the metal plates described herein. Furthermore, the presence of the accessory components are not required to be present in each embodiment of a filtration unit incorporating the directed scouring fluid method. For example, and without limitation, the effluent pipe 16 may be absent in certain embodiments and the effluent pipe 17 may function to remove the PRF and the influent fluid.

In a most basic embodiment, the filtration unit 100 adapted to carry out the directed scouring fluid method comprises a scouring fluid inlet pipe 119 comprising a plurality of scouring fluid nozzles 150. In a particular embodiment, the filtration unit 100 adapted to carry out the directed scouring fluid method comprises in addition to a scouring fluid inlet pipe 119 comprising a plurality of scouring fluid nozzles 150, one or more of the following: a housing 102, an upper plate 105, a filter media bed 109 comprising a plurality of porous filtration media units, at least one influent pipe (such as influent pipe 115, which may serve as the influent pipe for both the influent fluid 111 and the PRF 130) and at least one effluent pipe (such as effluent pipe 117 which may serve as the effluent pipe for both the influent fluid 111 and the PRF 130). Such filtration unit may also further comprise a bottom plate 107, and each of the upper 105 and lower 107 plates may containing a plurality of perforations 113a and 113b, respectively. Furthermore, the filtration unit may further comprise additional influent and effluent pipes, a plate actuator to provide movement of at least one of the upper 105 or lower 107 plates relative to one another or to provide differential movement of the plates relative to each other and other accessory components common in filtration units.

Figure 3A:
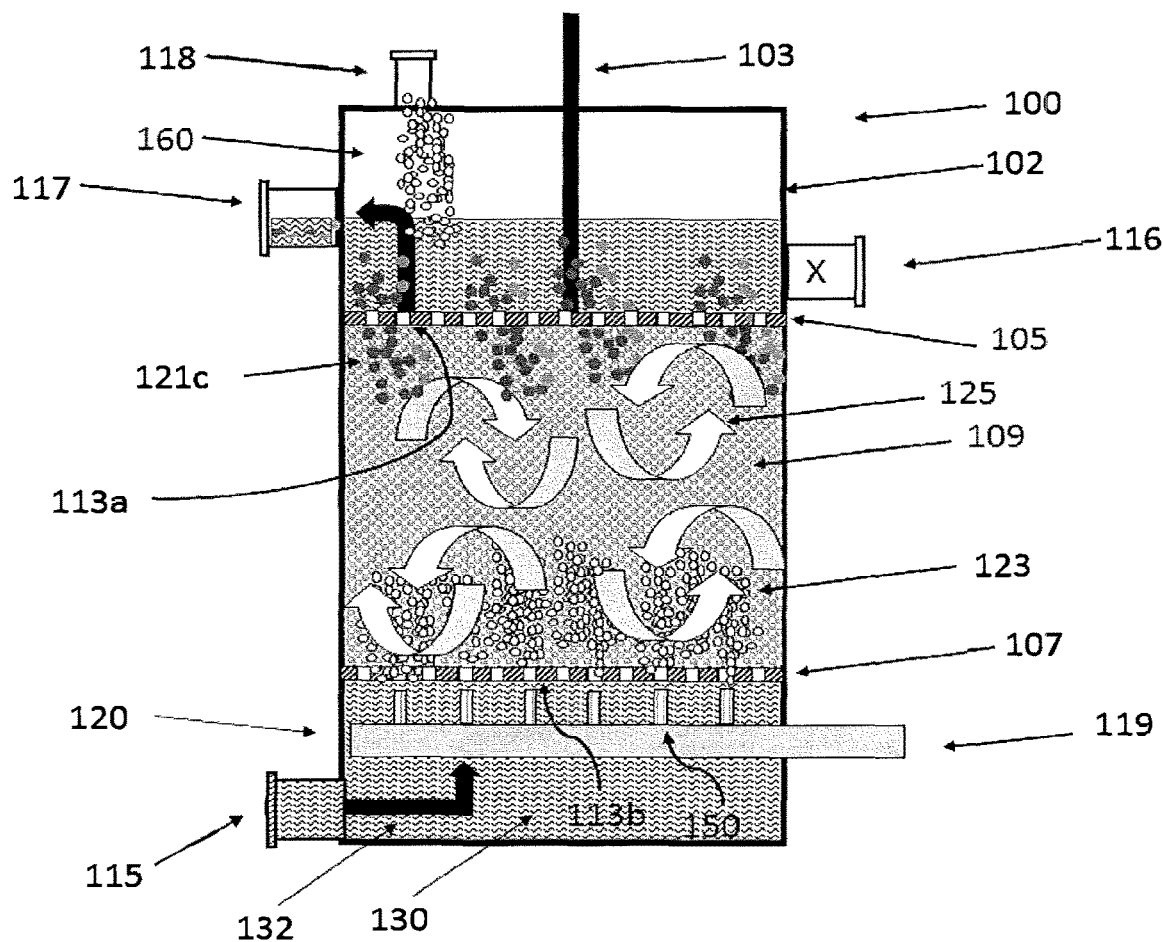
FIG. 3A shows a schematic of an improved filtration device incorporating the directed scouring fluid method for fluid filtration using porous filtration media during the washing process.

In the embodiment shown in FIG. 3A, the improved filtration unit 100 comprises a housing 102, a plate actuator 103, an upper moveable plate 105 containing a plurality of perforations 113a, a bottom plate 107 containing a plurality of perforations 113b, filter media bed 109 comprising a plurality of porous filtration media units, particularly compressible filtration media, an influent pipe 115, an effluent pipe 117 for the PRF 130, an effluent pipe 116 for the influent fluid, and a scouring fluid inlet pipe 119. The filter media bed 109 is contained by the housing 102 and the upper 105 and lower 107 plates which contain perforations, 113a and 113b, respectively, to allow the fluid (for example PRF 130 and influent fluid) to flow through while still retaining the porous filtration media in the filter media bed 109. FIG. 3A shows the filtration unit in a wash cycle.

The scouring fluid inlet pipe 119 comprises a plurality of scouring fluid nozzles 150 in fluid communication with the SF 123 (see FIGS. 3A-3F). The scouring fluid nozzle 150 comprises a restriction point as described herein. The restriction point is a domain within the scouring fluid nozzle having a reduced cross sectional area (for example, a reduced diameter) as compared another portion of the scouring fluid nozzle or as compared to opening 151 on scouring fluid inlet pipe 119 through which the SF 123 must travel before it exits the end of the scouring fluid nozzle. The restriction point may be located at any point within the scouring fluid nozzle.

The scouring fluid nozzle 150 comprises in one aspect a riser portion 152, the riser portion having an open first end 152a and an open second end 152b joined by side walls 152d and forming a passage 152c, and a restriction point 153. The SF 123 enters the riser 152 through end 152a, travels through passage 152c and exits through end 152b. The junction of the riser 152 with the opening 151 is a sealed junction. In this aspect, the restriction point 153 is a domain within riser 152 having a reduced cross sectional area (for example, a reduced diameter) as compared another portion of the scouring fluid nozzle (for example, ends 152a and/or 152b) or as compared to opening 151 on scouring fluid inlet pipe 119 through which the SF 123 must travel before it exits the end of the scouring fluid nozzle Bernoulli's principle requires the velocity of the SF 123 to increase as it passes through the restriction point 153, imparting a jet force (illustrated by arrow 127) to the SF 123 as it travels through passage 152c and/or exits the scouring fluid nozzle. The jet force 127 is provided while the flow rate of the scouring fluid is constant (for example, for SF delivered to the scouring fluid inlet pipe 119 at a flow rate of 10 CFM/ft$^2$, the velocity of the SF will be increased when using a scouring fluid nozzle 150 as described as compared to a scouring fluid nozzle lacking a restriction point). The jet force 127 provides more efficient forceful agitation of the porous filtration media, providing more efficient particle removal as discussed below.

The restriction point may be located at any point in riser 152. In one embodiment, the restriction point 153 is located at or adjacent to opening 152a; in such an embodiment, the restriction point 153 or elements creating the restriction point may contact, at least partially, opening 151 or scouring fluid inlet pipe 119. In another embodiment, the restriction point is located at or adjacent to end 152b. In another embodiment, restriction point 153 is located at a position in between ends 152a and 152b. The restriction point may also be placed at the center-line of riser 152 or left or right of the centerline of riser 152. Furthermore, the length of the domain having a reduced cross sectional area created by restriction point 153 may vary. In certain aspects, the length of the domain is a single point within riser 152 (for example, see FIG. 3D, right panel). In certain aspects, the length of the domain extends only along a portion of the length of riser 152 (for example, see FIG. 3E, left panel). In certain aspects, the length of the domain extends along all or substantially all the length of riser 152 as measured from the point at which the cross sectional area is reduced towards second end 152b (for example, see FIG. 3E, right panel).

The restriction point 153 may be provided in a number of ways. In a first aspect, the restriction point 153 is provided by providing one or more flanges 152e as illustrated in FIG. 3D (right side). FIG. 3D shows 2 flanges 152e positioned at the bottom of riser 152 at opening 152a, however 1 longer flange 152e may be used to create restriction point 153 and the placement of the flange(s) 152e may be placed at other locations in riser 152 as discussed herein.

In another aspect, the restriction point 153 is provided by restrictor 154 (shown in FIG. 3D, left side), which comprises a body 155 with an opening 156 through body 155 (which serves as restriction point 153). In this aspect, the riser 152 is in fluid communication with opening 151 through opening 156 of restrictor 154. The restrictor 154 may be provided as a separate component joined to either end of the riser 152 any may contact and/or be joined to opening 151 as well. Alternatively, the restrictor 154 may be supplied as an integral part of the scouring fluid nozzle 150 by inclusion in riser 152. As shown in FIG. 3D, the restrictor 154 is placed away from end 152a; however, the restrictor 154 may be placed at other locations in riser 152 as discussed herein.

Figure 3B:
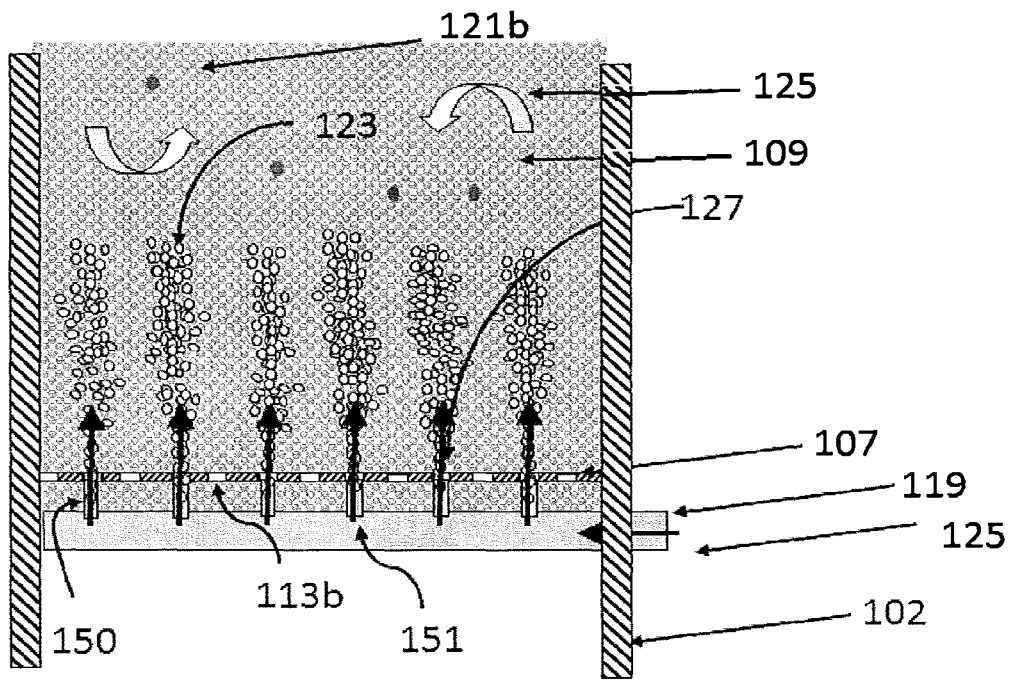
FIG. 3B shows a detailed view of the improved filtration device incorporating the directed scouring fluid method.
Figure 3C:
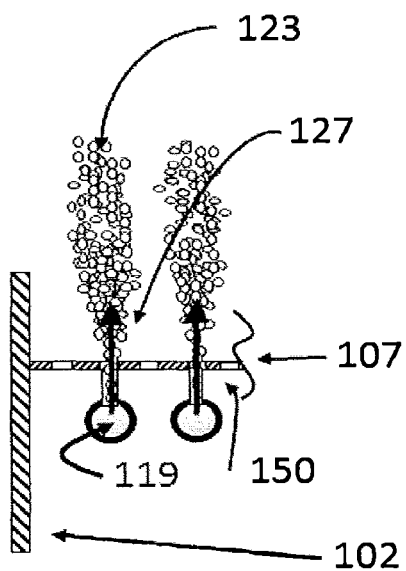
FIG. 3C shows a side view of the device of FIG. 3A illustrating the presence of multiple scouring fluid inlet pipes.
Figure 3D:
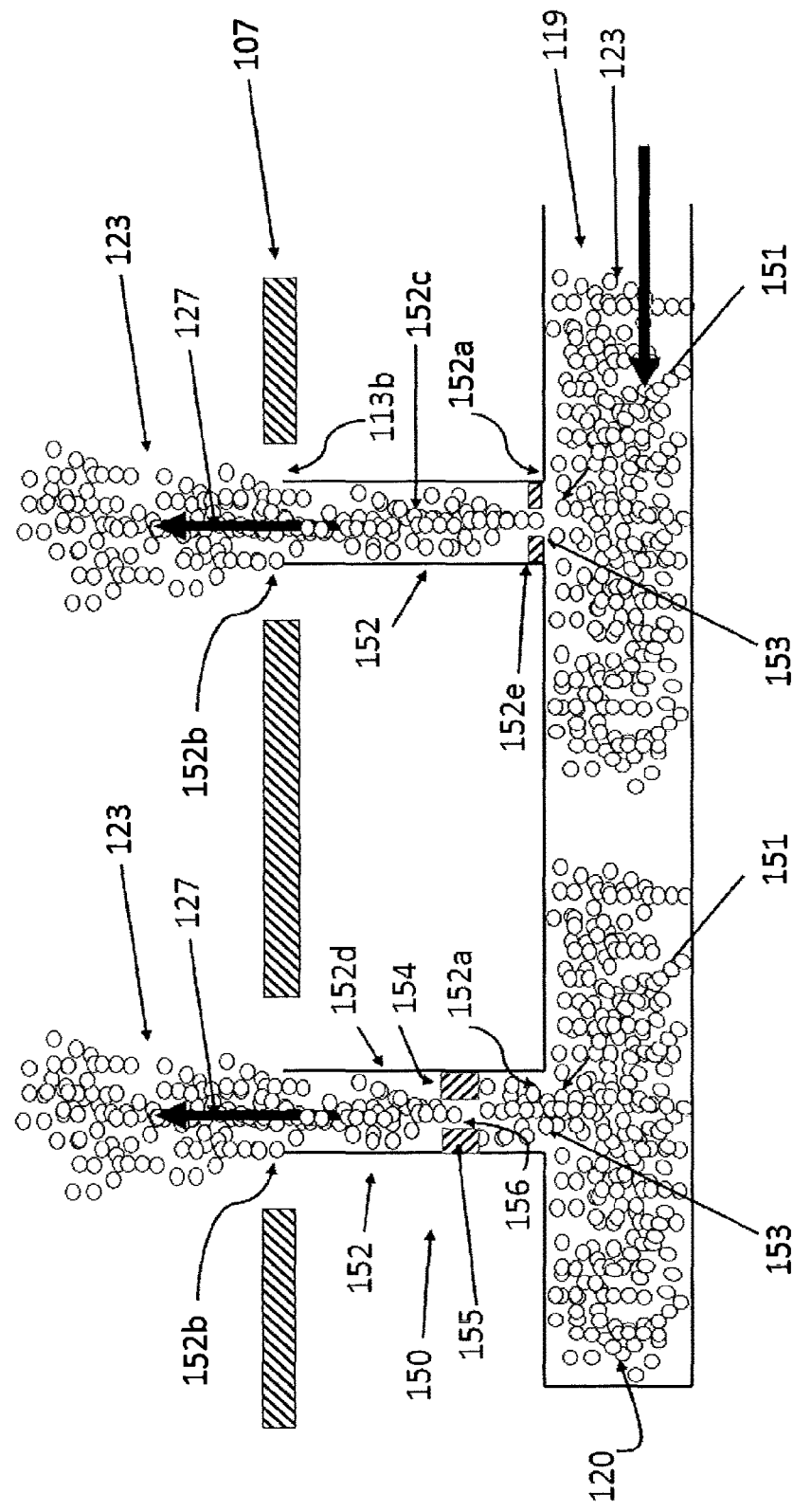
FIG. 3D shows a detailed view of two embodiments of the scouring fluid nozzle.
Figure 3E:
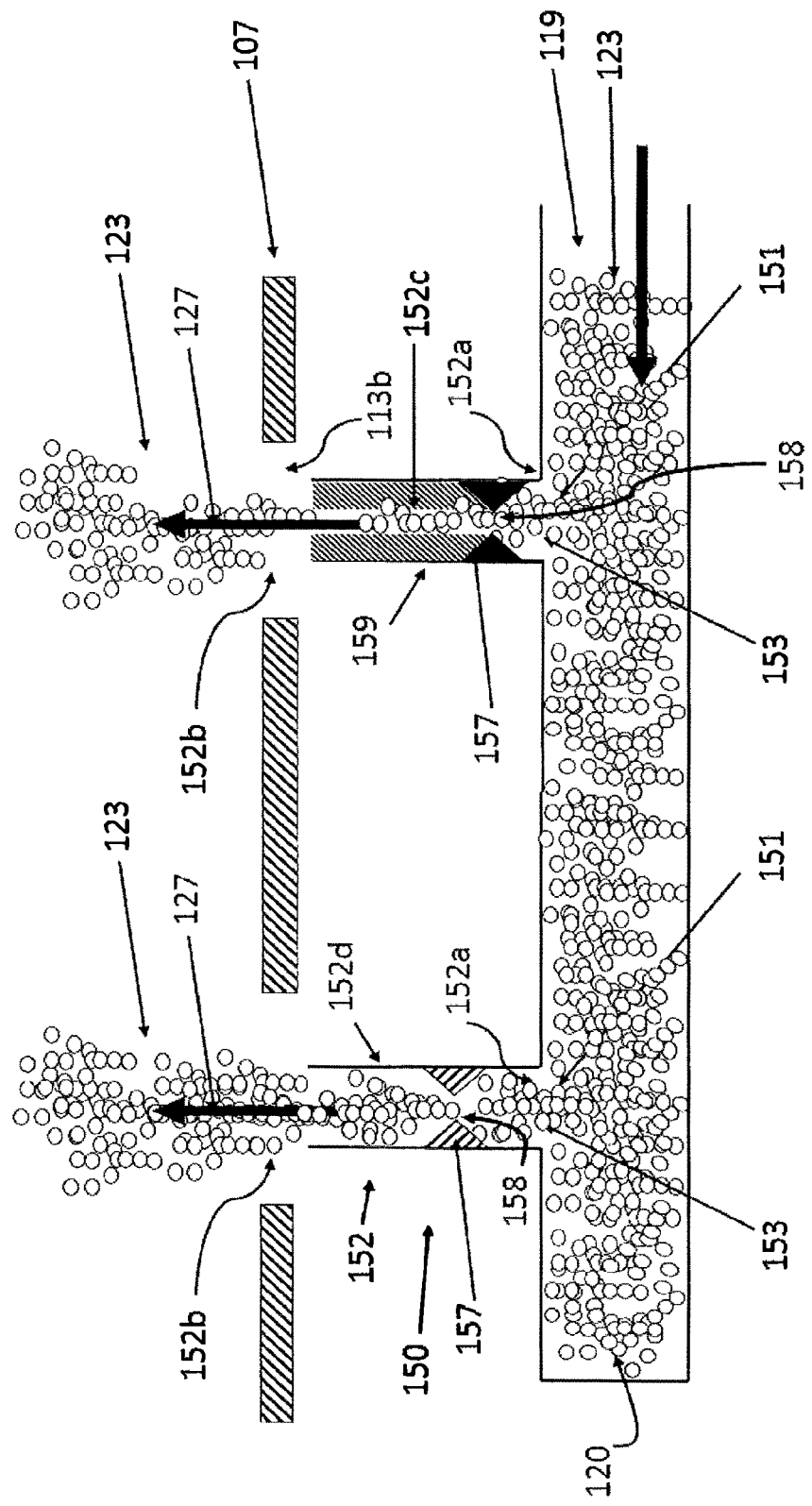
FIG. 3E shows a detailed view of two additional embodiments of the scouring fluid nozzle.

In still another aspect, the restriction point 153 is provided by a nozzle, indicated in FIG. 3E as 157. Nozzle 157 creates opening 158 which serves as restriction point 153. As shown in FIG. 3E, the nozzle 157 is placed away from end 152a; however, the nozzle 157 may be placed at other locations in riser 152 as discussed herein.

Figure 3F:
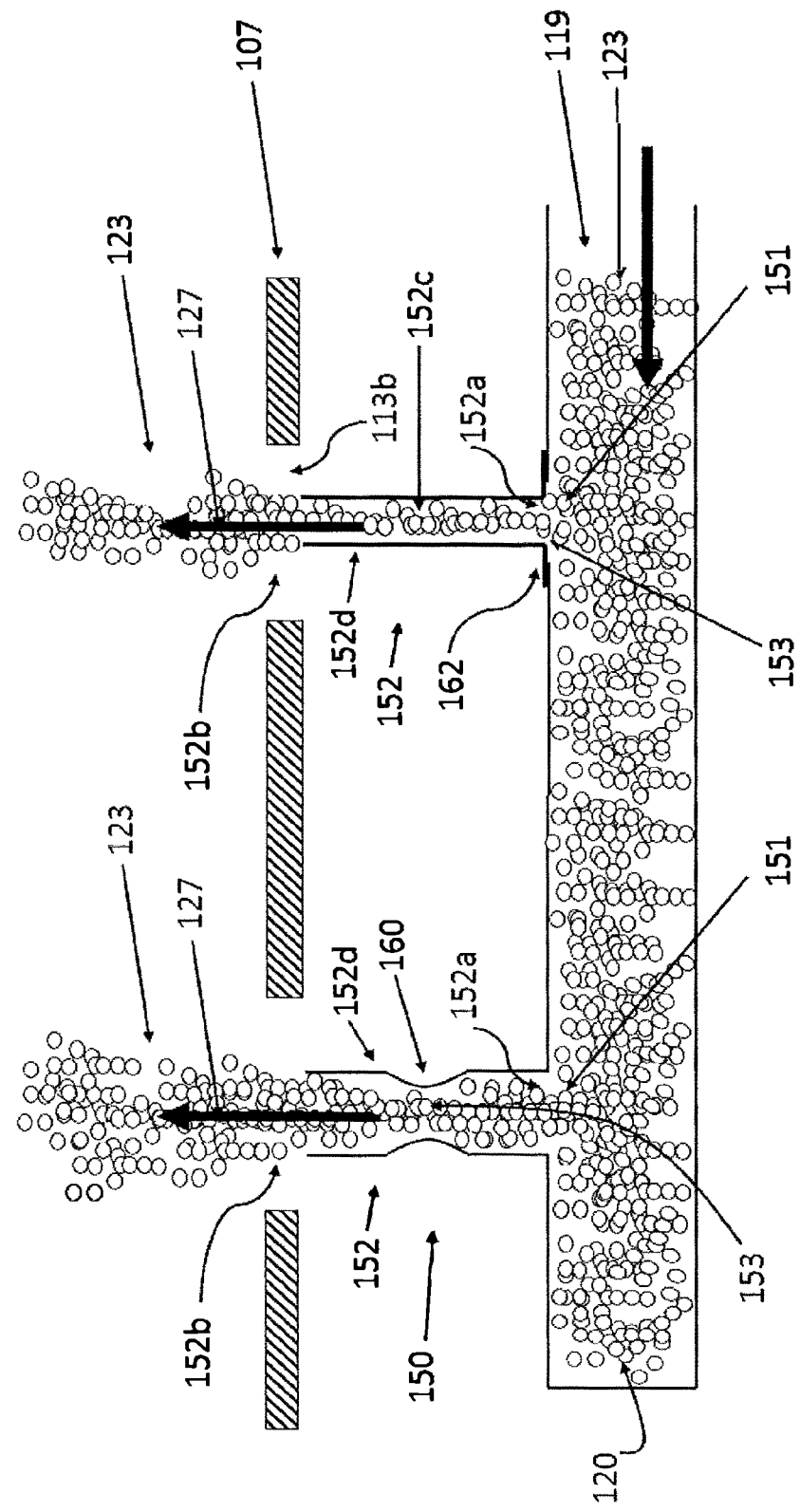
FIG. 3F shows a detailed view of two additional embodiments of the scouring fluid nozzle.

In another aspect, the restriction point 153 is provided by an inward deflection 160 of one or both of the side walls 152d of riser 152 (FIG. 3F, left side). In such an aspect, no additional element (for example, nozzle 157) is required to provide the restriction point 153. As shown in FIG. 3F, the inward deflection 160 is placed away in the middle portion of riser 152; however, the inward deflection 160 may be placed at other locations in riser 152 as discussed herein.

In still another aspect, riser 152 is provided with passage 152c that has a cross sectional area less than that of opening 151 (FIG. 3F, right panel). In this aspect, the passage 152c serves as the restriction point 153. The riser 152 is secured to the scouring fluid inlet pipe 119 to create restriction 153. Various methods may be used to secure riser 152, with FIG. 3E showing riser 152 being secured by legs 162 (which may be welded, for example, to scouring fluid inlet pipe 119).

In still another aspect, the restriction point 153 is provided by any means described herein and the domain of the restriction point 153 continues along at least a portion of passage 152c. An exemplary embodiment, is shown in FIG. 3E, right panel, where restriction point 153 is provided by nozzle 157 and the domain of the restriction point continues to the end 152b of riser 152 (through sidewalls 159). In certain aspects, the increased length of the domain of the restriction point aids in maintaining the jet force 127 of the SF 123.

In the above aspects, the smaller the ratio of the cross sectional area of restriction point 153 to opening 151 in the scouring fluid inlet pipe 119, the greater the jet force 127 of SF 123. In one embodiment, the ratio is less than 1.0 but greater than 0. In one embodiment, the ratio is less than or equal to 0.8, such as 0.7, 0.6, 0.5, 0.4 or 0.3, but greater than 0. In another embodiment, the ratio is from 0.3 to 0.8 (inclusive of the endpoints of the range). The various configurations for forming the restriction point may be varied (such as for example, varying the length of flange(s) 152e) to achieve the desired ratio.

The scouring fluid nozzles 150 as provided herein may be used in original construction of a filtration unit or may be used to retrofit an existing filtration unit to employ the directed scouring fluid method. Because the restriction point 153 is a component of the scouring fluid nozzle 150 (even though the restriction point 153 may contact opening 151 or other portions of the scouring fluid inlet pipe 119), such a retrofit is possible. For example, an existing filtration unit may be retrofitted by securing one of more scouring fluid nozzles 150 to the existing scouring fluid inlet pipe. Methods for the securing of various components, such as plastics and metals for example, are known in the art any may be used. Therefore, the present disclosure also provides a scouring fluid nozzle 150 in the embodiments described above as a separate and independent component. Furthermore, the scouring fluid inlet pipe along with one or more associated scouring fluid nozzles may also be provided as a replacement part in a retrofit operation. Therefore, the present disclosure also provides a scouring fluid inlet pipe 119 with at least one associated scouring fluid nozzle 150 in the embodiments described above as a separate and independent component.

The end 152b of scouring fluid nozzle 150 is placed in close proximity to the filter bed or when a bottom plate (such as 107) is present, a perforation 113b in bottom plate 107, to direct the SF 123 through perforation 113b and into filter media bed 109. In one embodiment, the end 152b may extend at least partially through perforation 113b. In another embodiments, the end 152b is positioned just below bottom plate 107. It is preferable to align the riser 152 of the scouring fluid nozzle 150 such that the mid-point of the diameter of the riser 152 is aligned approximately with the midpoint of the opening in perforation 113b to provide an unobstructed flow of SF 123 through opening 113b. The SF 123 may be delivered at a variety of pressures. In one embodiment, the scouring fluid is delivered at between 4 and 16 lbs pressure. In another embodiment, the scouring fluid is delivered at between 4 and 8 lbs pressure. In another embodiment, the scouring fluid is delivered at between 7 to 16 lbs pressure.

As discussed herein, the SF 123 is released with a jet force 127 as it exits the scouring fluid nozzle 150 imparting additional energy to the SF 123 (the jet force 127). The SF 123 will also be subject to the same buoyant force as described for the prior art embodiment above. Therefore, by use of scouring fluid nozzle 150, the SF 123 is delivered with greater force to the expanded filter media bed 109, resulting in a greater forceful agitation of the filter media bed 109.

In one embodiment, the SF 123 is compressed air, however other SFs may be used provided that the SF employed has a density that is less than the PRF and rises in the PRF. In one embodiment the influent stream itself serves as the PRF. In another embodiment, the PRF is water. The water may be potable water or may be water that is in need of filtration. As discussed herein and as is known in the art, other SFs and PRFs may be used in combination.

The materials from which the various components of the filtration unit 100 are constructed may be varied as is known in the art. In one embodiment, the riser 152 is made of the same material as the scouring fluid inlet pipe 119 and the restrictor 154, for example a metal material. In another embodiment, the riser 152 is constructed from a flexible material, such as a polymer, plastic or rubber provided that the flexible material has a rigidity sufficient to maintain the riser in an upright position when SF 123 is flowing through riser 152.

In the arrangement described above, the number of scouring fluid nozzles 150 present on scouring fluid inlet pipe 119 may vary. Furthermore, not every perforation 113*b* is required to have a scouring fluid nozzle 150 in proximity thereto. The size and configuration of the filtration unit will determine in part how many scouring fluid nozzles 150 are present. In one embodiment, 4 to 24 scouring fluid nozzles are present on scouring fluid inlet pipe 119. In another embodiment, 1 to 5 scouring fluid nozzles are present on scouring fluid inlet pipe 119. In another embodiment, 5 to 10 scouring fluid nozzles are present on scouring fluid inlet pipe 119. In another embodiment, 11 to 15 scouring fluid nozzles are present on scouring fluid inlet pipe 119. In another embodiment, 16 to 20 scouring fluid nozzles are present on scouring fluid inlet pipe 119. In another embodiment, 20 to 24 scouring fluid nozzles are present on scouring fluid inlet pipe 119.

As shown in FIG. 3B, the filtration unit may contain 1 or more than 1 scouring fluid inlet pipes 119. Furthermore, when a single scouring fluid inlet pipe is present, the scouring fluid inlet pipe may be contain 1 or more than one branches joined to a central pipe if desired with the scouring fluid inlet nozzles placed on each of the branches and/or the central pipe. Such embodiments may provide for more even distribution of the SF into the filter bed. In one embodiment, the filtration unit comprises 1 to 8 scouring fluid inlet pipes 119, with each scouring fluid inlet pipe 119 having 4 to 24 scouring fluid nozzles 150. When multiple scouring fluid inlet pipes are present, each may be associated with its own source of SF or multiple scouring fluid inlet pipes may share a common source of SF.

Further, the scouring fluid nozzles 150 present on a particular scouring fluid inlet pipe 119 or within the filtration unit are not required to be the same. In certain aspects, the restriction point 153 of the scouring fluid nozzles 150 may be created by different methods. In certain aspects, the ratio of the ratio of the cross sectional area of restriction point 153 to opening 151 in the scouring fluid inlet pipe 119 may be varied for individual scouring fluid nozzles 150 present on a particular scouring fluid inlet pipe 119 or within the filtration unit. In certain aspects, the length of the domain having a reduced cross sectional area created by restriction point 153 may be varied for individual scouring fluid nozzles 150 present on a particular scouring fluid inlet pipe 119 or within the filtration unit. Combinations of the foregoing may also be provided (for example, the ratio of the cross sectional area of restriction point 153 to opening 151 in the scouring fluid inlet pipe 119 and the length of the domain having a reduced cross sectional area created by restriction point 153 may be varied for individual scouring fluid nozzles 150 present on a particular scouring fluid inlet pipe 119 or within the filtration unit).

Figure 3G:
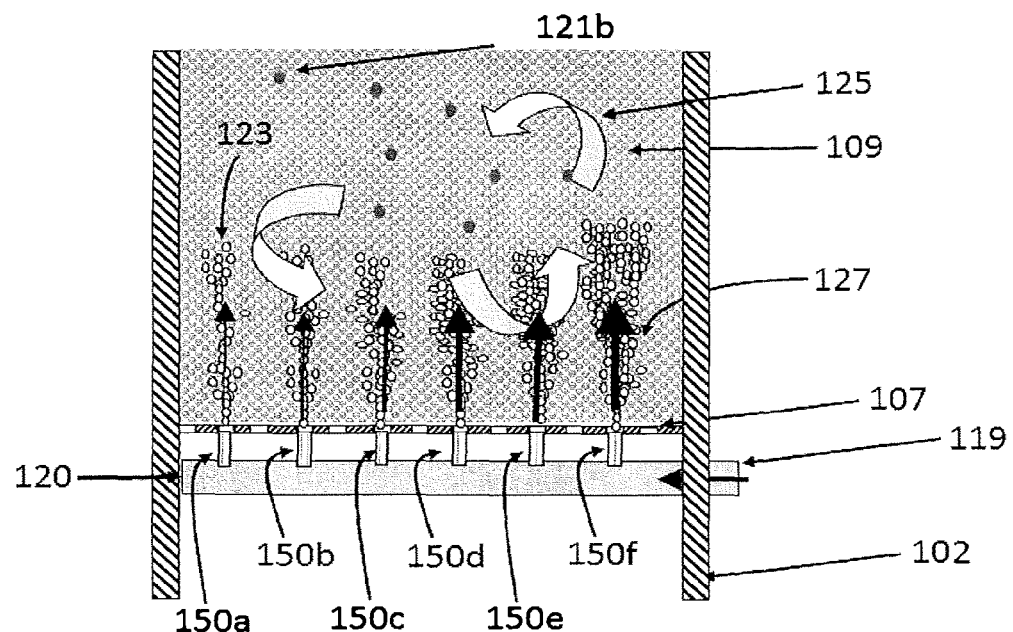
FIG. 3G shows an example of the formation of a jet force gradient along the length of a single scouring fluid inlet pipe (upper panel) or across multiple scouring fluid inlet pipes (lower panel).
Figure 3G:
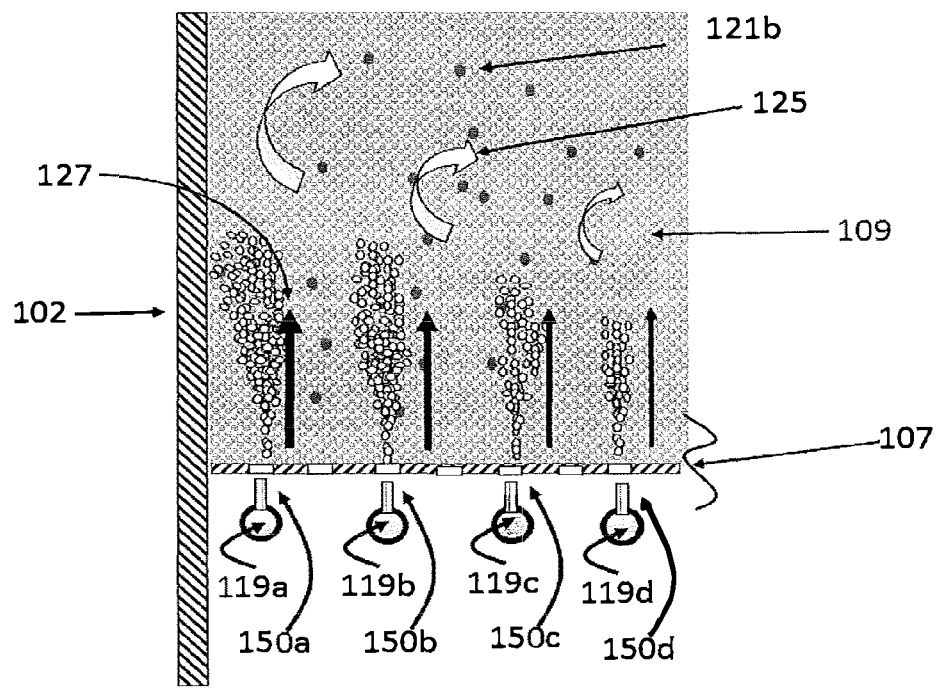

Furthermore, scouring fluid nozzles 150 may be arranged with different configurations on one or more of scouring fluid inlet pipes 119 or within the filtration unit on one or more of scouring fluid inlet pipes 119 to provide a desired pattern of forceful agitation of the porous filtration media by providing a gradient of jet force 127 created by the different configurations of the scouring fluid nozzles 150. As an example, in FIG. 3G upper panel, scouring fluid nozzles 150*a* to 150*f* are provided on a single scouring fluid inlet pipe 119, with at least a portion of the scouring fluid nozzles 150*a* to 150*f* providing a different jet force 127 to create a gradient of jet force 127 in the filter media bed 109. The differences in jet force may be created in any manner described herein (for example, by varying the ratio of the cross sectional area of restriction point 153 to opening 151 in the scouring fluid inlet pipe 119 and/or the length of the domain having a reduced cross sectional area created by restriction point 153). As seen in FIG. 3G upper panel, the jet force 127 in this example is the least near closed end 120 and is greatest as the distance from end 120 increases. The jet force 127 thereby creates a gradient to provide a desired pattern of forceful agitation indicated by arrows 125. The scouring fluid nozzles 150 on additional scouring fluid inlet pipes 119 in the filtration unit may each have the same configuration and produce the same jet force to maintain the jet force gradient across the filtration unit or may be configured differently to produce a different jet force gradient (or no additional gradient) across the filtration unit.

A jet force 127 gradient may also be produced between different scouring fluid inlet pipes 119 as shown in FIG. 3G, lower panel. In this example, scouring fluid inlet pipes 119*a* to 119*d* are provided with scouring nozzles 150*a* to 150*d*, with at least a portion of the scouring fluid nozzles 150*a* to 150*d* providing a different jet force 127 to create a gradient of jet force 127 in the filter media bed 109. As above, the differences in jet force may be created in any manner described herein. As seen in FIG. 3G lower panel, the jet force 127 in this example is the greatest near side wall 102 and is decreased as the distance from side wall 102 increases. The jet force 127 thereby creates a gradient to provide a desired pattern of forceful agitation indicated by arrows 125. The scouring fluid nozzles 150 on each scouring fluid inlet pipe 119 may each have the same configuration and produce the same jet force and maintain the jet force gradient along the length of the scouring fluid inlet pipe 119 or may be configured differently to produce a different jet force gradient along the length of the scouring fluid inlet pipe 119.

The above examples are illustrative only and other jet force gradients may be created.

The operation of the unit 100 is essentially the same as for the prior art device described above and illustrated in FIGS. 1 and 2, with the exception of the operation of the wash cycle. FIG. 3A shows the improved filtration unit 100 in the wash cycle with the upper plate 105 moved upward to provide an expanded filter media bed 109. During the wash cycle, if the influent fluid is serving as the PRF 130, then the flow of the influent fluid continues, but typically at a reduced rate. During the wash cycle, if the influent fluid is not serving as the PRF, the flow of influent fluid is terminated and flow of PRF 130 is initiated and PRF 130 is introduced to the filtration unit 100 through influent pipe 115 (flowing in the direction of arrow 132). In another embodiment, the PRF 130 enters the filtration unit 100 through a separate, dedicated PRF influent nozzle. The SF 123 is released under the expanded filter media bed 109 through scouring fluid inlet pipe 119 and scouring fluid nozzles 150. As the SF 123 rises into the filter media bed, it passes through perforations 113b in the lower plate 107 and agitates the individual porous filtration media units in the expanded filter media bed 109. This agitation, exemplified by the arrows 125, creates collisions between individual porous filtration media with one another and with the housing 102 and other components of the unit 100. These collisions cause the captured contaminant particles 121b to be released from the porous filtration media yielding released contaminant particles 121c which are carried by the PRF 130 away from the filter media bed 109 and through effluent pipe 117 (the influent fluid effluent pipe 116 is shown as closed). Due to the increased force with which SF 123 is delivered to the expanded filter media bed 109, the agitation of the expanded filter media bed 109 is significantly increased.

The efficiency of a wash cycle and the degree of cleaning (DOC) of the porous filtration media units is proportional to the magnitude of the forceful agitation (FA) of the individual porous filtration media units in the expanded filter media bed. As the FA increases, the magnitude of the impacts (MOI), which includes the number of impacts and the force of the individual impacts, of the porous filtration media units with each other, and with the components of the filtration unit (the vessel walls and upper and lower plates) increases. The force of these impacts frees the captured contaminant particles from the porous filtration media units, which allows the particles to be removed by the PRF that is flowing through the expanded filter media bed. The greater the number of impacts and the greater the MOI with which these impacts occur, the greater the DOC. A greater DOC allows for a shorter wash cycle time and/or the use of less PRF.

Mathematically, this can be stated as:
$DOC \propto MOI$ and $MOI \propto FA$
Therefore:

$$DOC \propto FA \qquad \text{(Equation 1)}$$

In the prior art device described above, (see FIGS. 1 and 2), the FA is totally dependent on the lighter density SF rising up through the heavier PRF (i.e., the buoyancy force, (BF). As the BF increases so does the FA.

Mathematically, for the prior art device, this can be represented as shown in Equation 2:

$$FA \propto BF \qquad \text{(Equation 2)}$$

As discussed above, in the new arrangement, (see FIGS. 3A-C), the SF exits the scouring fluid nozzles with increased velocity. Therefore, the SF has a jet force (JF) resulting from the new arrangement. Since the BF acting on the SF rising in the PRF is still at work, for the new arrangement, the FA is proportional to the JF plus the BF.

Mathematically, this can be represented as shown in Equation 3 (where FAN is the forceful agitation induced by the directed scouring fluid method):

$$FAN \propto JF + BF \qquad \text{(Equation 3)}$$

Since JF and BF are both positive values, JF+BF>BF. Therefore, using filtration unit shown in FIGS. 3A-3D results in a FA that is greater as compared to the prior art device described above. As FA is directly proportional to the DOC, the DOC for the filtration unit shown in FIGS. 3A-3D is greater than the DOC as compared to the DOC for the prior art device described above. Mathematically, this can be represented as shown in Equations 4 and 5 (where FA is the forceful agitation induced by the prior art device, DOC is the degree of cleaning achieved by the prior art device, $FA_N$ is the forceful agitation induced by the scouring fluid arrangement and $DOC_N$ is the degree of cleaning achieved by the directed scouring fluid arrangement);

$$FA_N > FA \qquad \text{(Equation 4)}$$

$$DOC_N > DOC \qquad \text{(Equation 5)}$$

Therefore, the directed scouring fluid method and the filtration unit shown in FIGS. 3A-3F incorporating the directed scouring fluid method results in a greater efficiency in the wash cycle and DOC as compared to the prior art device described herein.

As a result of the increased efficiency and DOC, the directed scouring fluid method and improved filtration unit provides benefits over the filtration units of the prior art. In one embodiment, the method and the improved filtration unit 100 results in a higher DOC of the porous filtration media as compared to prior art. In another embodiment, the method and the improved filtration unit 100 provides a DOC of the porous filtration media that approaches the DOC obtained when the porous filtration media was subject to a stringent wash using chemical additives, such as detergents. In another embodiment, the method and the improved filtration unit 100 provides a DOC of the porous filtration media that is comparable to that obtainable in the prior art, but with a wash cycle time that is less in duration than that of the prior art (for example, 20% less or greater, 25% less of greater, 30% less or greater, 35% less or greater, 40% less or greater, 45% less or greater or 50% less or greater or for example, less than 20 minutes, less than 18 minutes, less than 16 minutes, less than 14 minutes or 12 minutes or less). In another embodiment, the improved filtration unit 100 provides an increased rate of cleaning of the porous filtration media (for example, a greater DOC in the first 10 minutes of a wash cycle).

In a particular embodiment, the directed scouring fluid method and improved filtration unit removes at least 50% of the trapped contaminant particles from the filtration media units, including porous filtration media units, during a wash cycle. In such an embodiment, the duration of the wash cycle may be less than or equal to 25 minutes, 20 minutes, 15 minutes or 10 minutes.

In another particular embodiment, the directed scouring fluid method and improved filtration unit removes at least 60% of the trapped contaminant particles from the filtration media units, including porous filtration media units, during a wash cycle. In such an embodiment, the duration of the wash cycle may be less than or equal to 25 minutes, 20 minutes, 15 minutes or 10 minutes.

In a particular embodiment, the directed scouring fluid method and improved filtration unit removes at least 70% of the trapped contaminant particles from the filtration media units, including porous filtration media units, during a wash cycle. In such an embodiment, the duration of the wash cycle may be less than or equal to 30 minutes or 25 minutes.

In a particular embodiment, the directed scouring fluid method and improved filtration unit removes at least 80% of the trapped contaminant particles from the filtration media units, including porous filtration media units, during a wash cycle. In such an embodiment, the duration of the wash cycle may be less than or equal to 35 minutes.

In a particular embodiment, the directed scouring fluid method and improved filtration unit removes at least 50% of the trapped contaminant particles from the filtration media units, including porous filtration media units, during the first 10 minutes or a wash cycle. In a particular embodiment, the directed scouring fluid method and improved filtration unit removes at least 50% of the trapped contaminant particles from the filtration media units, including porous filtration media units, during the first 15 minutes or a wash cycle.

Transition Plenum

The principles of the transition plenum improvement are described below with reference to FIGS. 4A and 4B. The concept is illustrated in the context of a filtration unit 100 having an upper movable plate 105. However, the principles of operation apply equally to filtration units having a fixed upper plate 105 either in conjunction with a fixed lower plate 107 or a movable lower plate 107.

As described above, during the wash cycle, the introduced SF 123 rises through the PRF 130, impacting the porous filtration media along the way. Eventually, the SF 123 exits the PRF 130 and enters a liquid free zone at the top of the filtration unit (160). The SF 123 exits the filtration unit 100 through scouring fluid exit pipe 118. When the SF 123 exits the PRF 130, small amounts of the PRF 130 are carried by the SF 123 upwards away from the bulk PRF 130 creating a transition zone 200. In the transition zone 200 there is no clearly defined interface between the SF 123 and the PRF 130. The transition zone can be visualized by the froth (illustrated by 206) created by the action of the SF 123 leaving the PRF 130. The transition zone occurs only during the washing cycle.

In the prior art device described an illustrated in FIGS. 1-2, the transition zone occurred only above the upper plate 5 in an area where no porous filtration media units are present. Surprisingly, it has been found that by controlling the operating parameters of the filtration unit 100 as described herein, the location of the transition zone 200 can be controlled such that a portion of the transition zone 200 extends below the upper plate 105 as well as above the upper plate 105. As a result, the porous filtration media units are present in and subject to the effects of the transition zone 200. The area of the transition zone 200 below the upper plate 105 is defined as the transition plenum 202.

In the transition plenum 202, a portion of the individual porous media filtration units in the filter media bed (204, shown in solid black) escape the PRF 130 and continue to travel upward (in the direction of the upper plate 105) in the transition plenum 202. As discussed herein, during the wash cycle the SF 123 is released under pressure and rises in the PRF 130 and enters the filter media bed 109 where is creates a forceful agitation of the individual porous filtration media in filter media bed 109. As the SF 123 is lighter than the PRF 130, the SF continues to rise in the PRF in the form of bubbles. As the SF 123 encounters the individual porous filtration media units, the buoyancy of the SF 123 carries the individual porous filtration media units upward towards the underside of the upper plate 105. As the individual porous filtration media units move upward, a drag force is created by the PRF 130 which slows the upward motion and at the same time creates a stored potential energy in the individual porous filtration media units.

Due to the action of the SF 123, a portion of the individual porous filtration media units reach and exit the PRF 130 and enters the transition plenum 202. When this occurs, the drag force is eliminated or greatly reduced, and due to the stored potential energy created by the drag force, the individual porous filtration media units 204 exits the PRF 130 and enter the transition plenum 202 with a force and "pop" out of the PRF 130 into the transition plenum 202. The individual porous filtration media units are propelled by this sling-shot action and impact the upper plate 105, the side walls 102 of the filtration unit as well as collide with one another in the transition plenum. As the collisions occur with an increased energy in the transition plenum 202 as compared to corresponding collisions in the PRF 130, the collisions in the transition plenum 202 release an increased amount of trapped contaminant particles 121b as compared to the collisions occurring in the PRF 130 increasing the amount of released contaminant particles 121c. The released contaminant particles 121c are then carried away by the PRF 130 through effluent pipe 117 as described.

The greater the potential energy stored in the individual porous filtration media units, the greater the energy the individual porous filtration media units have when they exit the PRF 123 and enter into the transition plenum. The faster the SF 123 causes the individual porous filtration media units to rise in the PRF 130, the greater the stored potential energy. Therefore, when the directed scouring fluid method described herein is coupled with the creation of a transition plenum, the SF is provided with a jet force 127 (see FIG. 3B) created by the scouring fluid nozzles 150 and due to the increased force, causes the individual porous filtration media units to rise faster in the PRF 130 and increases the stored potential energy in the individual porous filtration media units. As a result, the force of the collisions created in the transition plenum 202 may be further increased. Therefore, in one embodiment the directed scouring fluid method and the transition plenum method may be used in conjunction with one another to produce increased release of trapped contaminant particles in the porous filtration media units. The dual use of both approaches results in a synergistic cleaning effect in one aspect of this embodiment. In another embodiment, the transition plenum method is used without the directed scouring fluid method to produce increased release of trapped contaminant particles in the porous filtration media units The transition plenum 202 is created by controlling one or more of the operating parameters of the filtration unit 100. Parameters suitable for controlling to create the transition plenum 202 include the SF flow rate, the PRF flow rate, the relative positions of the upper and lower plates to one another, the ratio of the height of the filter media bed from the filtration cycle to the wash cycle, the relative position of the upper plate to the particle removal fluid effluent pipe and the distance from the top surface of the lower plate to the bottom of the invert of the particle removal fluid effluent pipe and the distance from the top of the lower plate to the bottom of the upper plate during the wash cycle. The values of the individual parameters will depend in part on the characteristics of the filtration unit (for example, the volume of the filtration unit, the dimensions of the filtration unit and the like). The exemplary parameters below are provided for a model filtration unit to provide an embodiment of the operating principles. The model filtration unit has a total vertical height of 87.2 inches, a circular cross section with a diameter of 11.75 inches, a filter media bed area of 108.4 square inches, a filter media bed depth during filtration of 30 inches, a filter media bed volume of 3,252 cubic inches during filtration and an influent stream design flow rate during filtration of 23 gpm. As the characteristics of the filtration unit differ from these of the model filtration unit, the values for the parameters below may also change.

Figure 4A:
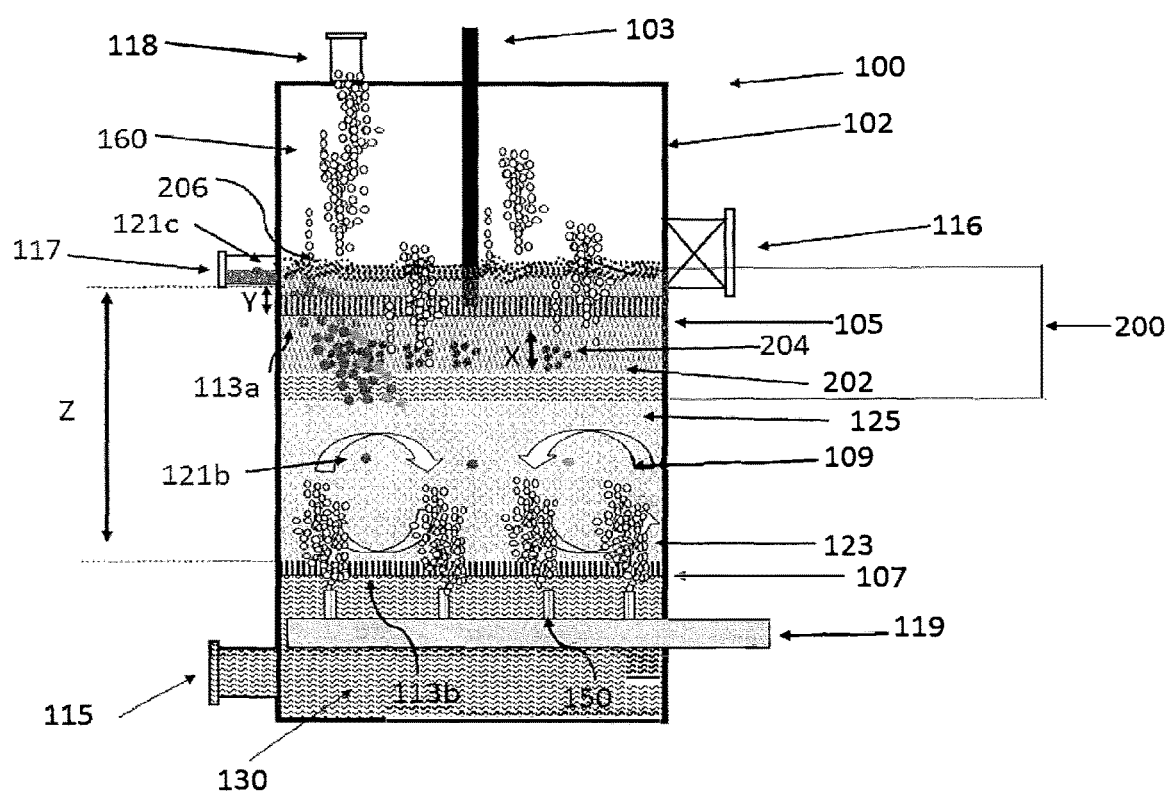
FIG. 4A shows a schematic of an improved filtration device incorporating the transition plenum method for fluid filtration using porous filtration media during the washing process.
Figure 4B:
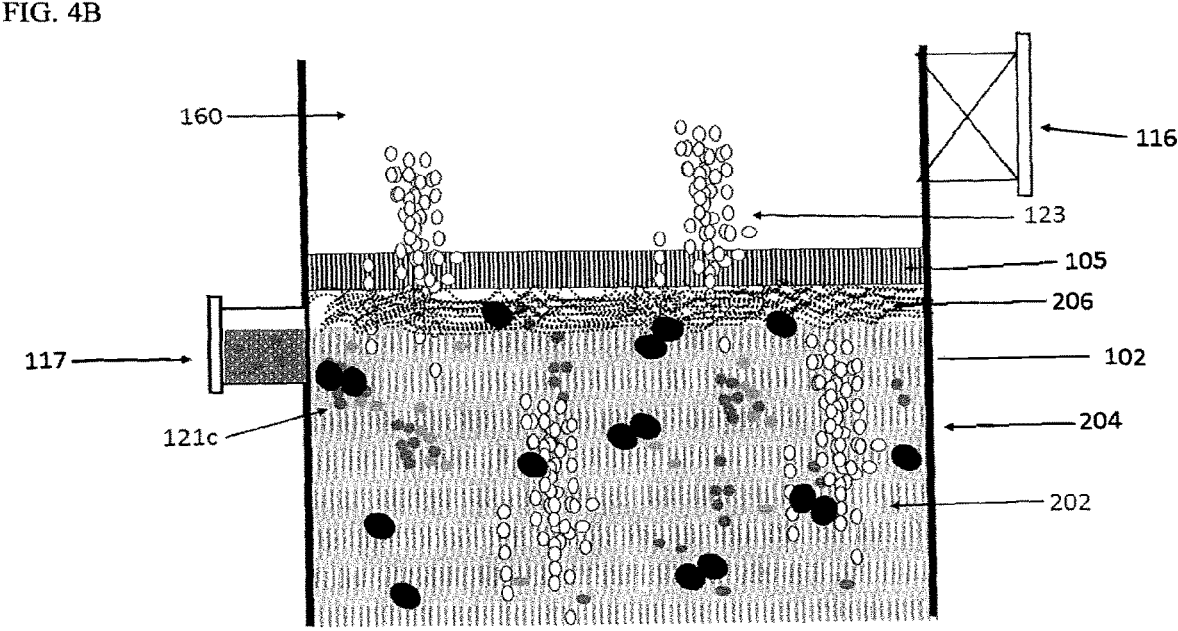
FIG. 4B shows a detailed view of the transition plenum with the location of the effluent pipe positioned below the upper plate.

In one aspect, the transition plenum 202 is created by proper selection of the distance from the top of the lower plate 107 to the bottom of the invert of the effluent pipe 117 for the PRF (the distance Z in FIG. 4A) and controlling the distance between the bottom of the upper 105 and the top of the bulk PRF (the area where the transition plenum begins) (the distance X in FIG. 4A). In the prior art, the distance Z for filtration units of the description above ranged from 72 inches to 96 inches and the distance X did not exist. In one aspect of the transition plenum method and device for carrying out such method, for filtration units of the description above the distance X ranges from 1 to 6 inches while the distance Z ranges from 48 inches to 72 inches, such as, but not limited to, 62 inches to 72 inches. Therefore, Furthermore, in one aspect of the transition plenum method and device for carrying out such method for the transition plenum method and device for carrying out such method, the particle removal effluent pipe is placed in a lower position (i.e., closer to the lower plate 107) as compared to its corresponding position in the devices of the prior art. If the distance Z is not properly selected during the design of the filtration unit, the capability of creating a transition plenum during wash cycles will be diminished. Therefore, the present disclosure provides a filtration unit wherein the distance Z is from 62 inches to 72 inches. In certain embodiments, the lower plate 107 may be fixed and the placement of the bottom of the invert of the effluent pipe for the PRF located from 62 inches to 72 inches from the top of the lower plate 107. In certain aspects, the lower plate 107 may be moveable allowing greater latitude in the placement of the effluent pipe for the PRF. In the foregoing, aspects, the flow rate of the PRF and/or SF may be as described herein, with the flow of the PRF and/or SF being continuous or intermittent and the distance Y selected as described herein.

In another aspect, the transition plenum 202 is created by controlling the ratio of the height of the filter media bed from the filtration cycle (HF) to the wash cycle (Hw). In the prior art, the ratio $H_W:H_F$ was 2:1 or less. In one aspect of the transition plenum method and device for carrying out such method, the ratio $H_W:H_F$ is greater than or equal to 2:1. In another embodiment of the transition plenum method and device for carrying out such method, the ratio $H_W:H_F$ is greater than or equal to 2.5:1. In another embodiment of the transition plenum method and device for carrying out such method, the ratio $H_W:H_F$ is greater than or equal to 3:1. In another embodiment of the transition plenum method and device for carrying out such method, the ratio $H_W:H_F$ is greater than or equal to 2:1 and less than 4:1. In another embodiment of the transition plenum method and device for carrying out such method, the ratio $H_W:H_F$ is in the range of greater than or equal to 2:1 and less than or equal to 3:1. In the foregoing, aspects, the flow rate of the PRF and/or SF may be as described herein, with the flow of the PRF and/or SF being continuous or intermittent and the distances X, Y and Z selected as described herein.

In another aspect, the transition plenum 202 is created by controlling the distance between the bottom portion of the upper plate 105 and to the bottom of the invert (the lowest portion of the opening of the effluent pipe) of the effluent pipe 117 (the distance Y in FIG. 4A) during the wash cycle. In one aspect, the smaller the distance Y, the larger the transition plenum. In the prior art, the distance Y ranges from 20 inches to 48 inches. In one aspect of the transition plenum method and device for carrying out such method, the distance Y is less than 15 inches, such as less than 10 inches or less than 6 inches. In another embodiment of the transition plenum method and device for carrying out such method, the distance Y the ranges from 0 inches to 6 inches. In the foregoing, aspects, the flow rate of the PRF and/or SF may be as described herein, with the flow of the PRF and/or SF being continuous or intermittent, and the distances X, and Z selected as described herein.

In another aspect, the transition plenum 202 is created by controlling the flow rate of the PRF. The flow rate is typically measured in units of volume/time/area, where area is the cross sectional area of filter media bed (such as gallons or cubic feet/minute/ft$^2$). In the prior art, the flow rate of the PRF ranges from 10 gpm/ft$^2$ to 40 gpm/ft$^2$. In one aspect of the transition plenum method and device for carrying out such method, the flow rate of the PRF is less than 10 gpm/ft$^2$. In another embodiment of the transition plenum method and device for carrying out such method, the flow rate of the PRF is less than 5 gpm/ft$^2$. In another embodiment of the transition plenum method and device for carrying out such method, the flow rate of the PRF ranges from 5 gpm/ft$^2$ to 10 gpm/ft$^2$. In another embodiment of the transition plenum method and device for carrying out such method, the flow rate of the PRF is intermittent instead of continuous. In another embodiment of the transition plenum method and device for carrying out such method, the flow rate of the PRF is less than 5 gpm/ft$^2$ or less 10 gpm/ft$^2$ and the flow rate of the PRF is intermittent. In another aspect of the transition plenum method and device for carrying out such method, the flow rate of the PRF ranges from 5 gpm/ft$^2$ to 10 gpm/ft$^2$ and the flow rate of the PRF is intermittent. In the foregoing, aspects, the flow rate of SF may be as described herein, with the flow of the SF being continuous or intermittent and the distances X, Y and Z selected as described herein.

In another aspect, the transition plenum 202 is created by controlling the flow rate of the SF. The flow rate is typically measured in units of volume/time/area, where area is the cross sectional area of filter media bed (such as gallons or cubic feet/minute/ft$^2$). In the prior art, the flow rate of the SF ranges from 10 CFM/ft$^2$ to 20 CFM/ft$^2$. In one aspect of the transition plenum method and device for carrying out such method, the flow rate of the SF is greater than 30 CFM/ft$^2$. In another aspect of the transition plenum method and device for carrying out such method, the flow rate of the SF is greater than 40 CFM/ft$^2$. In another aspect of the transition plenum method and device for carrying out such method, the flow rate of the SF is greater than 50 CFM/ft$^2$. In another aspect of the transition plenum method and device for carrying out such method, the flow rate of the SF ranges from 40 CFM/ft$^2$ to 60 CFM/ft$^2$. In another aspect of the transition plenum method and device for carrying out such method, the flow rate of the SF ranges from 50 CFM/ft$^2$ to 60 CFM/ft$^2$. In another aspect of the improved art, the flow rate of the SF is intermittent instead of continuous. In another aspect of the transition plenum method and device for carrying out such method, the flow rate of the SF is greater than 30 CFM/ft$^2$, such as greater than 40 CFM/ft$^2$ or 50 CFM/ft$^2$, and the flow rate of the SF is intermittent. In another aspect of the transition plenum method and device for carrying out such method, the flow rate of the SF ranges from 40 CFM/ft$^2$ to 60 CFM/ft$^2$, such as from ranges from 50 CFM/ft$^2$ to 60 CFM/ft$^2$, and the flow rate of the SF is intermittent. In the foregoing, aspects, the flow rate of the PRF may be as described herein, with the flow of the PRF being continuous or intermittent and the distances X, Y and Z selected as described herein.

In another aspect, the transition plenum 202 is created by controlling the flow rate of the SF and the flow rate of the PRF in conjunction. In the prior art, the ratio of the flow rate of the SF to the PRF was less than 15 to 1. In one aspect of the transition plenum method and device for carrying out such method, the ratio of the flow rate of the SF to the PRF is greater than 15 to 1, such as 20 to 1. In another aspect of the transition plenum method and device for carrying out such method, the ratio of the flow rate of the SF to the PRF is greater than 30 to 1. In another aspect of the transition plenum method and device for carrying out such method, the ratio of the flow rate of the SF to the PRF is greater than 40 to 1. In another aspect of the transition plenum method and device for carrying out such method, the ratio of the flow rate of the SF to the PRF is in the range of 20 to 1 to 50 to 1. The flow rates of the SF and PRF discussed above are used in certain embodiments of the foregoing, with the flow of the SF and/or PRF being continuous or intermittent.

In another aspect, the transition plenum 202 is created by controlling the flow rate of the SF, the flow rate of the PRF and the distance Y in conjunction with one another. In one aspect of the transition plenum method and device for carrying out such method, the flow rate of the SF is greater than the flow rate of the PRF and the distance Y is less than 15 inches. For example, in a particular aspect the flow rate of the SF may be in the range of 50 to 60 CFM/ft$^2$, the flow rate of the PRF may be in the range of 5 to 10 gpm/ft$^2$. In another particular aspect, the flow rate of the SF may be in the range of 15 to 60 CFM/ft$^2$, the flow rate of the PRF may be in the range of 5 to 15 gpm/ft$^2$. In another aspect of the transition plenum method and device for carrying out such method, the ratio of the flow rate of the SF to the PRF is greater than 20 to 1 and the distance Y is less than 15 inches. In another aspect of the transition plenum method and device for carrying out such method, the ratio of the flow rate of the SF to the PRF is greater than 40 to 1 and the distance Y is less than 6 inches.

In another aspect, the transition plenum 202 is created by controlling the flow rate of the SF, the flow rate of the PRF, the distance Z and the distance Y in conjunction with one another. In one aspect of the transition plenum method and device for carrying out such method, the flow rate of the SF is greater than the flow rate of the PRF, the distance Z is in the range of 48 inches to 60 inches and the distance Y is less than 15 inches. For example, in a particular aspect the flow rate of the SF may be in the range of 50 to 60 CFM/ft$^2$, the flow rate of the PRF may be in the range of 5 to 10 gpm/ft$^2$. In another particular aspect, the flow rate of the SF may be in the range of 15 to 60 CFM/ft$^2$, the flow rate of the PRF may be in the range of 5 to 15 gpm/ft$^2$. In another aspect of the transition plenum method and device for carrying out such method, the ratio of the flow rate of the SF to the PRF is greater than 20 to 1, the distance Z is in the range of 54 inches to 60 inches and the distance Y is less than 15 inches. In another aspect of the transition plenum method and device for carrying out such method, the ratio of the flow rate of the SF to the PRF is greater than 40 to 1, the distance Z is in the range of 54 inches to 60 inches and the distance Y is less than 6 inches.

As shown in FIG. 4A, the effluent pipe 117 is located above the upper plate 105. However, in an alternate embodiment, the effluent pipe 117 is located below the upper plate 105 as shown in FIG. 4B (showing a magnified view of the transition plenum 202. In this embodiment, the majority of the transition zone 200 is located below the upper plate 105, making the transition plenum 202 the majority of the transition zone 200 in this embodiment. In FIG. 4B, the same reference numbers identify the same components as in FIG. 4A. FIG. 4B shows in greater detail the collisions between the individual porous filtration media units 204 in the transition plenum 202 with the generation of released contaminant particles 121c. other than the placement of the effluent pipe 117 below the upper plate 105, the operation of this embodiment is the same as that described for FIG. 4A.

Figure 4C:
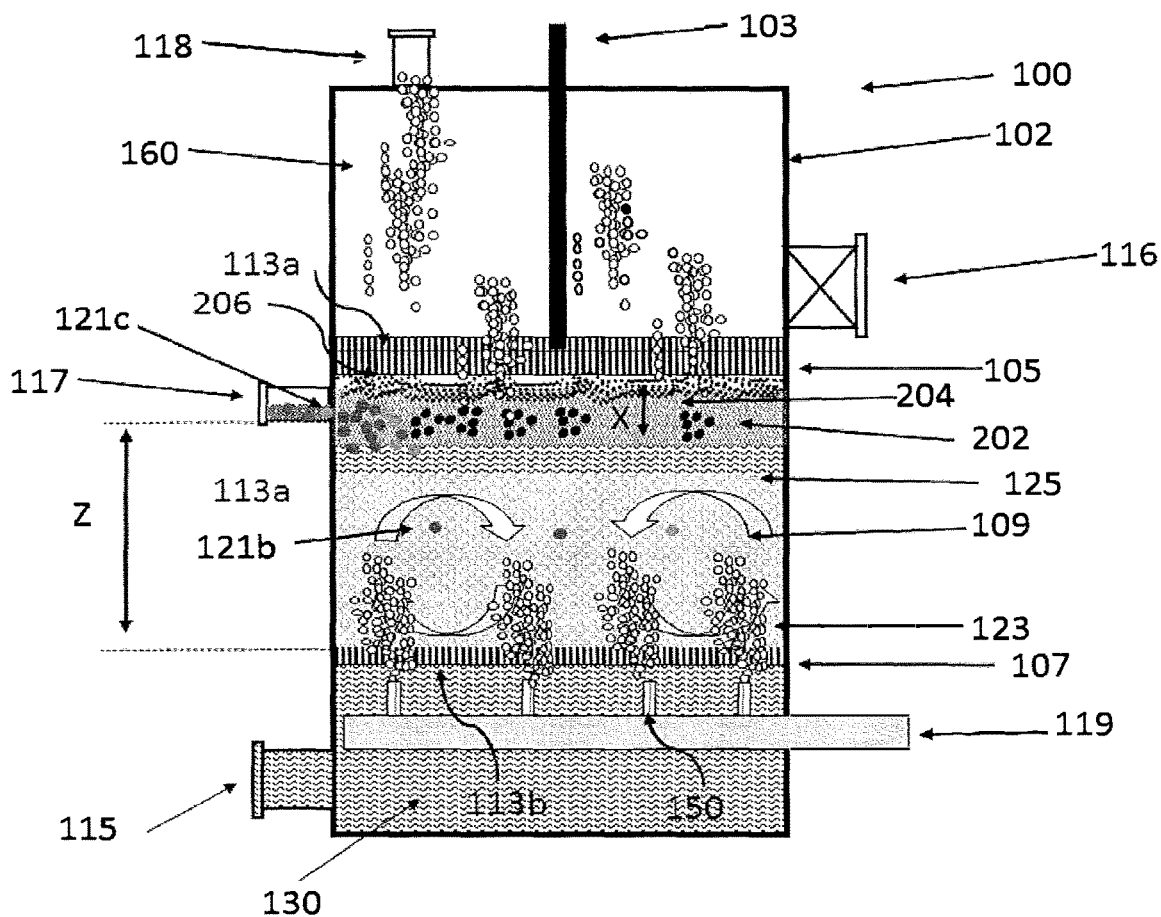
FIG. 4C shows a schematic of an improved filtration device incorporating the directed scouring fluid method and the transition plenum method for fluid filtration using porous filtration media during the washing process.

Therefore, in one embodiment, the present disclosure provides an improved filtration unit having an effluent pipe 117 position below upper plate 105. An embodiment of a filtration device incorporating the directed scouring fluid method and having an effluent pipe 117 below the upper plate 105 is shown in FIG. 4C. The reference numbers in FIG. 4C correspond to the reference numerals used in FIGS. 3A-3D and FIGS. 4A-4B.

Certain Embodiments of the Apparatus for Conducting Directed Scouring Fluid Method The present disclosure also provides for an apparatus for conducting the directed scouring fluid method. In one embodiment, the apparatus comprises a scouring fluid inlet pipe comprising a plurality of openings on a top portion of the scouring fluid inlet pipe and a scouring fluid nozzle in fluid communication with at least one of the openings on the scouring fluid inlet pipe, wherein the scouring fluid nozzle comprises a restriction point. In one aspect, the scouring fluid nozzles 150 comprise a riser 152 having an open first end 152a and an open second end 152b joined by side walls 152d and forming a passage 152c, and a restriction point 153. Any embodiment of the scouring fluid nozzle 150 described herein may be used.

In the foregoing aspect, the restriction point may be located at any point in riser 152. In one embodiment, the restriction point 153 is located at or adjacent to opening 152a; in such an embodiment, the restriction point 153 may also contact, at least partially, opening 151. In another embodiment, the restriction point is located at or adjacent to end 152b. In another embodiment, restriction point 153 is located at a position in between ends 152a and 152b. The restriction point may also be placed at the center-line of riser 152 or left or right of the centerline of riser 152. Further, in the foregoing aspects, the ratio of the cross sectional area of restriction point 153 to opening 151 in the scouring fluid inlet pipe 119 is less than 1.0 but greater than 0, such as less than or equal to 0.8, such as 0.7, 0.6, 0.5, 0.4 or 0.3. In another embodiment, the ratio of the diameter of restriction point 153 to opening 151 is from 0.3 to 0.8.

In particular embodiments of the foregoing aspects, the scouring fluid nozzles 150 may be selected from the embodiments below (with reference numbers corresponding to FIGS. 3D-3F).

In one embodiment, the scouring fluid nozzle 150 comprises a riser 152 having an open first end 152a and an open second end 152b joined by side walls 152d and forming a passage 152c and one or more flanges 152e (which provide the restriction point 153). As discussed herein, the placement of the flange(s) 152e may be placed at various locations in riser 152.

In another embodiment, the scouring fluid nozzle 150 comprises a riser 152 having an open first end 152a and an open second end 152b joined by side walls 152d and forming a passage 152c and a restrictor 154, the restrictor comprising a body 155 with an opening 156 through body 155 (which serves as restriction point 153). In this aspect, the riser 152 is in fluid communication with opening 151 through opening 156 of restrictor 154. As discussed herein, the placement of the restrictor 154 may be placed at various locations in riser 152.

In still another embodiment, the scouring fluid nozzle 150 comprises a riser 152 having an open first end 152a and an open second end 152b joined by side walls 152d and forming a passage 152c and a nozzle 157 (which serves as restriction point 153).

In still another embodiment, the scouring fluid nozzle 150 comprises a riser 152 having an open first end 152a and an open second end 152b joined by side walls 152d and forming a passage 152c, with at least one of side walls 152d having an inward deflection 160 (which serves as restriction point 153).

The pinch point may be created as discussed herein, such as by a nozzle 157 or inward deflection 160. As discussed herein, the nozzle 157 or inward deflection 160 may be placed at various locations in riser 152.

In still another embodiment, the scouring fluid nozzle 150 comprises a riser 152 having an open first end 152a and an open second end 152b joined by side walls 152d and forming a passage 152c, wherein the riser 152 is provided with passage 152c that has a diameter less than that of opening 151 (which serves as the restriction point 153). The riser 152 is secured to the scouring fluid inlet pipe 119 as discussed herein, such as by legs 162.

In still another embodiment, the scouring fluid nozzle 150 comprises a riser 152 having an open first end 152a and an open second end 152b joined by side walls 152d and forming a passage 152c and a restriction point 153, wherein the diameter of passage 152c continues to be restricted for at least a portion of the distance between restriction point 153 to end 152b.

Certain Embodiments of the Filtration Unit

The filtration unit has been described above in the methods for carrying out the specific methods. As discussed, the configuration of the filtration unit may vary depending on the cleaning method employed and other factors. All such descriptions are intended to be descriptions of the filtration unit. The description below discusses exemplary configurations of the filtration device and is not intended to be limiting.

In one aspect, the filtration unit 100 adapted to carry out the directed scouring fluid method comprises a scouring fluid inlet pipe 119 comprising a plurality of openings 151 on a top portion of the scouring fluid inlet pipe 119 and a scouring fluid nozzle 150 in fluid communication with at least one of the openings 151, and at least one of a housing 102, an upper plate 105 containing a plurality of perforations 113a, a filter media bed 109 comprising a plurality of porous filtration media units, influent pipe 115 (which may serve as the influent pipe for both the influent fluid 111 and the PRF 130) and an effluent pipe 117 for the PRF 130. In one aspect, the scouring fluid nozzles 150 comprise a riser 152 having an open first end 152a and an open second end 152b joined by side walls 152d and forming a passage 152c, and a restriction point 153. Any embodiment of the scouring fluid nozzle 150 described herein may be used.

Such filtration unit may also further comprise a bottom plate 107 containing a plurality of perforations 113b, an additional effluent pipe, an additional influent pipe, a plate actuator to moveably engaged with at least one of the upper 105 or lower 107 plates to provide movement of at least one of plates 105 and 107 relative to another portion of the filtration unit and/or to one another and other accessory components common in filtration units.

In another aspect, the filtration unit 100 adapted to carry out the transition plenum method comprises an upper plate 105 containing a plurality of perforations 113a and an effluent pipe 117 for the PRF 130, wherein the effluent pipe 117 is located above the upper plate 105 and the distance Y is less than 15 inches, such as 6 inches or less, and at least one of a housing 102, a filter media bed 109 comprising a plurality of porous filtration media units, influent pipe 115 (which may serve as the influent pipe for both the influent fluid 111 and the PRF 130).

Such filtration unit may also further comprise scouring fluid inlet pipe 119 comprising a plurality of scouring fluid nozzles 150, a bottom plate 107 containing a plurality of perforations 113b, an additional effluent pipe, an additional influent pipe, a plate actuator to moveably engaged with at least one of the upper 105 or lower 107 plates to provide movement of at least one of plates 105 and 107 relative to another portion of the filtration unit and/or to one another and other accessory components common in filtration units. In one aspect, the scouring fluid nozzles 150 comprise a riser 152 having an open first end 152a and an open second end 152b joined by side walls 152d and forming a passage 152c, and a restriction point 153. Any embodiment of the scouring fluid nozzle 150 described herein may be used.

In another aspect, the filtration unit 100 adapted to carry out the transition plenum method comprises an upper plate 105 containing a plurality of perforations 113a and an effluent pipe 117 for the PRF 130, wherein the effluent pipe 117 is located below the upper plate 105, and at least one of a housing 102, a filter media bed 109 comprising a plurality of porous filtration media units, influent pipe 115 (which may serve as the influent pipe for both the influent fluid 111 and the PRF 130).

Such filtration unit may also further comprise scouring fluid inlet pipe 119 comprising a plurality of scouring fluid nozzles 150, a bottom plate 107 containing a plurality of perforations 113b, an additional effluent pipe, an additional influent pipe, a plate actuator to moveably engaged with at least one of the upper 105 or lower 107 plates to provide movement of at least one of plates 105 and 107 relative to another portion of the filtration unit and/or to one another and other accessory components common in filtration units. In one aspect, the scouring fluid nozzles 150 comprise a riser 152 having an open first end 152a and an open second end 152b joined by side walls 152d and forming a passage 152c, and a restriction point 153. Any embodiment of the scouring fluid nozzle 150 described herein may be used.

In another aspect, the filtration unit adapted to carry out the directed scouring fluid method and the transition plenum method comprises a scouring fluid inlet pipe 119 comprising a plurality of openings 151 on a top portion of the scouring fluid inlet pipe 119 and a scouring fluid nozzle 150 in fluid communication with at least one of the openings 151, an upper plate 105 containing a plurality of perforations 113a and an effluent pipe 117 for the PRF 130, wherein the effluent pipe 117 is located above the upper plate 105 and the distance Y is less than 15 inches and at least one of a housing 102, a filter media bed 109 comprising a plurality of porous filtration media units, and influent pipe 115 (which may serve as the influent pipe for both the influent fluid 111 and the PRF 130). In one aspect, the scouring fluid nozzles 150 comprise a riser 152 having an open first end 152a and an open second end 152b joined by side walls 152d and forming a passage 152c, and a restriction point 153. Any embodiment of the scouring fluid nozzle 150 described herein may be used.

Such filtration unit may also further comprise a bottom plate 107 containing a plurality of perforations 113b, an additional effluent pipe, an additional influent pipe, a plate actuator to moveably engaged with at least one of the upper 105 or lower 107 plates to provide movement of at least one of plates 105 and 107 relative to another portion of the filtration unit and/or to one another and other accessory components common in filtration units.

In another aspect, the filtration unit adapted to carry out the directed scouring fluid method and the transition plenum method comprises a scouring fluid inlet pipe 119 comprising a plurality of openings 151 on a top portion of the scouring fluid inlet pipe 119 and a scouring fluid nozzle 150 in fluid communication with at least one of the openings 151, an upper plate 105 containing a plurality of perforations 113a and an effluent pipe 117 for the PRF 130, wherein the effluent pipe 117 is located below the upper plate 105 and at least one of a housing 102, a filter media bed 109 comprising a plurality of porous filtration media units and influent pipe 115 (which may serve as the influent pipe for both the influent fluid 111 and the PRF 130). In one aspect, the scouring fluid nozzles 150 comprise a riser 152 having an open first end 152a and an open second end 152b joined by side walls 152d and forming a passage 152c, and a restriction point 153. Any embodiment of the scouring fluid nozzle 150 described herein may be used.

Such filtration unit may also further comprise a bottom plate 107 containing a plurality of perforations 113b, an additional effluent pipe, an additional influent pipe, a plate actuator to moveably engaged with at least one of the upper 105 or lower 107 plates to provide movement of at least one of plates 105 and 107 relative to another portion of the filtration unit and/or to one another and other accessory components common in filtration units.

In the foregoing aspects, the restriction point may be located at any point in riser 152. In one embodiment, the restriction point 153 is located at or adjacent to opening 152a; in such an embodiment, the restriction point 153 may also contact, at least partially, opening 151. In another embodiment, the restriction point is located at or adjacent to end 152b. In another embodiment, restriction point 153 is located at a position in between ends 152a and 152b. The restriction point may also be placed at the center-line of riser 152 or left or right of the centerline of riser 152. Further, in the foregoing aspects, the ratio of the cross sectional area of restriction point 153 to opening 151 in the scouring fluid inlet pipe 119 is less than 1.0 but greater than 0, such as less than or equal to 0.8, such as 0.7, 0.6, 0.5, 0.4 or 0.3. In another embodiment, the ratio of the diameter of restriction point 153 to opening 151 is from 0.3 to 0.8.

In particular embodiments of the foregoing aspects, the scouring fluid nozzles 150 may be selected from the embodiments below (with reference numbers corresponding to FIGS. 3D-3F).

In one embodiment, the scouring fluid nozzle 150 comprises a riser 152 having an open first end 152a and an open second end 152b joined by side walls 152d and forming a passage 152c and one or more flanges 152e (which provide the restriction point 153). As discussed herein, the placement of the flange(s) 152e may be placed at various locations in riser 152.

In another embodiment, the scouring fluid nozzle 150 comprises a riser 152 having an open first end 152a and an open second end 152b joined by side walls 152d and forming a passage 152c and a restrictor 154, the restrictor comprising a body 155 with an opening 156 through body 155 (which serves as restriction point 153). In this aspect, the riser 152 is in fluid communication with opening 151 through opening 156 of restrictor 154. As discussed herein, the placement of the restrictor 154 may be placed at various locations in riser 152.

In still another embodiment, the scouring fluid nozzle 150 comprises a riser 152 having an open first end 152a and an open second end 152b joined by side walls 152d and forming a passage 152c and a nozzle 157 (which serves as restriction point 153).

In still another embodiment, the scouring fluid nozzle 150 comprises a riser 152 having an open first end 152a and an open second end 152b joined by side walls 152d and forming a passage 152c, with at least one of side walls 152d having an inward deflection 160 (which serves as restriction point 153).

The pinch point may be created as discussed herein, such as by a nozzle 157 or inward deflection 160. As discussed herein, the nozzle 157 or inward deflection 160 may be placed at various locations in riser 152.

In still another embodiment, the scouring fluid nozzle 150 comprises a riser 152 having an open first end 152a and an open second end 152b joined by side walls 152d and forming a passage 152c, wherein the riser 152 is provided with passage 152c that has a diameter less than that of opening 151 (which serves as the restriction point 153). The riser 152 is secured to the scouring fluid inlet pipe 119 as discussed herein, such as by legs 162.

In still another embodiment, the scouring fluid nozzle 150 comprises a riser 152 having an open first end 152a and an open second end 152b joined by side walls 152d and forming a passage 152c and a restriction point 153, wherein the diameter of passage 152c continues to be restricted for at least a portion of the distance between restriction point 153 to end 152b.

In the foregoing aspects, when a scouring fluid inlet pipe 119 is provided the filtration unit may contain 1 or more than 1 scouring fluid inlet pipes 119. In one embodiment, the filtration unit comprises 1 to 8 scouring fluid inlet pipes 119. When multiple scouring fluid inlet pipes are present, each may be associated with its own source of SF or multiple scouring fluid inlet pipes may share a common source of SF. In the foregoing aspects, the number of scouring fluid nozzles 150 present on scouring fluid inlet pipe 119 may vary (and when multiple scouring fluid inlet pipes are present, the number of scouring fluid nozzles on each may vary). Furthermore, not every perforation 113b is required to have a scouring fluid nozzle 150 in proximity thereto. The size and configuration of the filtration unit will determine in part how many scouring fluid nozzles 150 are present. In one embodiment, 4 to 24 scouring fluid nozzles are present on scouring fluid inlet pipe 119. In another embodiment, 1 to 5 scouring fluid nozzles are present on scouring fluid inlet pipe 119. In another embodiment, 5 to 10 scouring fluid nozzles are present on scouring fluid inlet pipe 119.

Furthermore, in the foregoing aspects, as discussed above the scouring fluid nozzles 150 may be arranged with different configurations on one or more of scouring fluid inlet pipes 119 or within the filtration unit on one or more of scouring fluid inlet pipes 119 to provide a desired pattern of forceful agitation of the porous filtration media by providing a gradient of jet force 127 created by the different configurations of the scouring fluid nozzles 150 as shown in FIG. 3G (upper and lower panels).

Methods of Use

The present disclosure also provides methods of using the filtration devices and apparatus disclosed herein.

In one aspect, the present disclosure provides for a method of carrying out a wash cycle in a filtration device utilizing the directed scouring fluid method as described herein. Such method may achieve one or more of the benefits discussed herein.

In one embodiment of this aspect, the apparatus comprises a scouring fluid inlet pipe comprising a plurality of openings on a top portion of the scouring fluid inlet pipe and a scouring fluid nozzle in fluid communication with at least one of the openings on the scouring fluid inlet pipe, wherein the scouring fluid nozzle comprises a restriction point. In one aspect, the scouring fluid nozzles 150 comprise a riser 152 having an open first end 152a and an open second end 152b joined by side walls 152d and forming a passage 152c, and a restriction point 153. Any embodiment of the scouring fluid nozzle 150 described herein may be used.

In another aspect, the present disclosure provides for a method for carrying out a wash cycle in a filtration device, the filtration device comprising a filter bed of porous filtration media units and a scouring fluid inlet pipe comprising a plurality of openings on a top portion of the scouring fluid inlet pipe and a scouring fluid nozzle in communication with at least one of the openings on the scouring fluid inlet pipe, wherein the method comprises the step of directing a scouring fluid from the scouring fluid nozzle into the filter bed, wherein the scouring fluid nozzles comprise a restriction point to provide a jet force to the scouring fluid.

The above configurations are exemplary in nature only and any configuration of the filtration device described for use in the directed scouring fluid method may be used with the methods described herein.

Such method comprises providing a source of the SF, wherein the scouring fluid inlet pipe is in communication with the source for the SF and directing the SF through the described scouring fluid inlet pipes into the filter bed, wherein the SF has jet force generated by the scouring fluid nozzles. The method may further comprise providing a source of PRF and directing the PRF into the filter bed as described herein. The method may still further comprise providing a blower for directing the SF and a pump for directing the PRF. In certain embodiments, the scouring fluid is compressed air. In certain embodiments, the particle removal fluid is water. Any of the various flow rates for the SF and/or PRF as described for the directed scouring fluid method may be used in such method.

In one aspect, the present disclosure provides for a method for carrying out a wash cycle in a filtration device comprising utilizing an apparatus for conducting the transition plenum method as described herein.

In one embodiment of this aspect, the filtration unit comprises an upper plate 105 containing a plurality of perforations 113a and an effluent pipe 117 for the PRF 130, wherein the effluent pipe 117 is located above the upper plate 105 and the distance Y is less than 15 inches, such as 6 inches or less. The filtration device for conducting the transition plenum method may further comprise the other components of the filtration unit as described herein.

In another embodiment of this aspect, the filtration unit 100 adapted to carry out the transition plenum method comprises an upper plate 105 containing a plurality of perforations 113a and an effluent pipe 117 for the PRF 130, wherein the effluent pipe 117 is located below the upper plate 105. The filtration device for conducting the transition plenum method may further comprise the other components of the filtration unit as described herein.

The above configurations are exemplary in nature only and any configuration of the filtration device described for use in the transition plenum method may be used with the methods described herein.

Such method comprises providing a source of the SF, wherein the scouring fluid inlet pipe is in communication with the source for the SF and directing the SF through the described scouring fluid inlet pipes into the filter bed. The method may further comprise providing a source of PRF and directing the PRF into the filter bed as described herein. The method may still further comprise providing a blower for directing the SF and a pump for directing the PRF. In certain embodiments, the scouring fluid is compressed air. In certain embodiments, the particle removal fluid is water. Any of the various flow rates for the SF and/or PRF as described for the transition plenum method may be used in such method. For example, the flow rate of the PRF is less than 10 gpm/ft$^2$, the flow rate of the SF is greater than 40 CFM/ft$^2$ and/or the ratio of the flow rate of the SF to the PRF is greater than 15 to 1.

In one aspect, the present disclosure provides for a method for carrying out a wash cycle in a filtration device comprising utilizing an apparatus for conducting the directed scouring fluid method transition plenum method as described herein.

In one embodiment of this aspect, the filtration unit 100 adapted to carry out the directed scouring fluid method and the transition plenum method comprises a scouring fluid inlet pipe 119 comprising a plurality of openings 151 on a top portion of the scouring fluid inlet pipe 119 and a scouring fluid nozzle 150 in fluid communication with at least one of the openings 151, an upper plate 105 containing a plurality of perforations 113a and an effluent pipe 117 for the PRF 130, wherein the effluent pipe 117 is located above the upper plate 105 and the distance Y is less than 15 inches, wherein the scouring fluid nozzles comprise a restriction point to provide a jet force to the scouring fluid. The filtration device for conducting the directed scouring fluid method and the transition plenum method may further comprise the other components of the filtration unit as described herein.

In another embodiment of this aspect, the filtration unit 100 adapted to carry out the directed scouring fluid method and the transition plenum method comprises a scouring fluid inlet pipe 119 comprising a plurality of openings 151 on a top portion of the scouring fluid inlet pipe 119 and a scouring fluid nozzle 150 in fluid communication with at least one of the openings 151, an upper plate 105 containing a plurality of perforations 113a and an effluent pipe 117 for the PRF 130, wherein the effluent pipe 117 is located below the upper plate 105, wherein the scouring fluid nozzles comprise a restriction point to provide a jet force to the scouring fluid. The filtration device for conducting the directed scouring fluid method and the transition plenum method may further comprise the other components of the filtration unit as described herein.

The above configurations are exemplary in nature only and any configuration of the filtration device described for use in the directed scouring fluid method and the transition plenum method may be used in combination with one another with the methods described herein.

Such method comprises providing a source of the SF, wherein the scouring fluid inlet pipe is in communication with the source for the SF and directing the SF through the described scouring fluid inlet pipes into the filter bed, wherein the SF has jet force generated by the scouring fluid nozzles. The method may further comprise providing a source of PRF and directing the PRF into the filter bed as described herein. The method may still further comprise providing a blower for directing the SF and a pump for directing the PRF. In certain embodiments, the scouring fluid is compressed air. In certain embodiments, the particle removal fluid is water. Any of the various flow rates for the SF and/or PRF as described for the transition plenum method may be used in such method. For example, the flow rate of the PRF is less than 10 gpm/ft$^2$, the flow rate of the SF is greater than 40 CFM/ft² and/or the ratio of the flow rate of the SF to the PRF is greater than 15 to 1.

In certain embodiments of the above methods, the porous filtration media is a synthetic porous filtration media or a compressible filtration media.

In certain embodiments of the above methods, the porous filtration media contains trapped particulate contaminants and the wash cycle removes at least 60% of the trapped contaminant particles. In certain embodiments, the duration of the wash cycle is less than or equal to 20 minutes.
In certain embodiments, the duration of the wash cycle is less than or equal to 15 minutes.
In certain embodiments, the duration of the wash cycle is less than or equal to 10 minutes.

In certain embodiments of the above methods, the porous filtration media contains trapped particulate contaminants and the wash cycle removes at least 80% of the trapped contaminant particles. In certain embodiments, the duration of the wash cycle is less than or equal to 35 minutes.

In certain embodiments of the above methods when a scouring fluid nozzle is present, the restriction point may be located at any point in riser 152. In one embodiment, the restriction point 153 is located at or adjacent to opening 152a; in such an embodiment, the restriction point 153 may also contact, at least partially, opening 151. In another embodiment, the restriction point is located at or adjacent to end 152b. In another embodiment, restriction point 153 is located at a position in between ends 152a and 152b. The restriction point may also be placed at the center-line of riser 152 or left or right of the centerline of riser 152. Further, in the foregoing aspects, the ratio of the cross sectional area of restriction point 153 to opening 151 in the scouring fluid inlet pipe 119 is less than 1.0 but greater than 0, such as less than or equal to 0.8, such as 0.7, 0.6, 0.5, 0.4 or 0.3. In another embodiment, the ratio of the diameter of restriction point 153 to opening 151 is from 0.3 to 0.8.

In certain embodiments of the above methods when a scouring fluid nozzle is present, the scouring fluid nozzles 150 may be selected from the embodiments below (with reference numbers corresponding to FIGS. 3D-3F).

In one embodiment, the scouring fluid nozzle 150 comprises a riser 152 having an open first end 152a and an open second end 152b joined by side walls 152d and forming a passage 152c and one or more flanges 152e (which provide the restriction point 153). As discussed herein, the placement of the flange(s) 152e may be placed at various locations in riser 152.

In another embodiment, the scouring fluid nozzle 150 comprises a riser 152 having an open first end 152a and an open second end 152b joined by side walls 152d and forming a passage 152c and a restrictor 154, the restrictor comprising a body 155 with an opening 156 through body 155 (which serves as restriction point 153). In this aspect, the riser 152 is in fluid communication with opening 151 through opening 156 of restrictor 154. As discussed herein, the placement of the restrictor 154 may be placed at various locations in riser 152.

In still another embodiment, the scouring fluid nozzle 150 comprises a riser 152 having an open first end 152a and an open second end 152b joined by side walls 152d and forming a passage 152c and a nozzle 157 (which serves as restriction point 153).

In still another embodiment, the scouring fluid nozzle 150 comprises a riser 152 having an open first end 152a and an open second end 152b joined by side walls 152d and forming a passage 152c, with at least one of side walls 152d having an inward deflection 160 (which serves as restriction point 153).

The pinch point may be created as discussed herein, such as by a nozzle 157 or inward deflection 160. As discussed herein, the nozzle 157 or inward deflection 160 may be placed at various locations in riser 152.

In still another embodiment, the scouring fluid nozzle 150 comprises a riser 152 having an open first end 152a and an open second end 152b joined by side walls 152d and forming a passage 152c, wherein the riser 152 is provided with passage 152c that has a diameter less than that of opening 151 (which serves as the restriction point 153). The riser 152 is secured to the scouring fluid inlet pipe 119 as discussed herein, such as by legs 162.

In still another embodiment, the scouring fluid nozzle 150 comprises a riser 152 having an open first end 152a and an open second end 152b joined by side walls 152d and forming a passage 152c and a restriction point 153, wherein the diameter of passage 152c continues to be restricted for at least a portion of the distance between restriction point 153 to end 152b.

Measurement of the Degree of Cleaning

The DOC is one endpoint for demonstrating the improved function of the methods and devices of the present disclosure. A variety of methods may be used to measure the degree of cleaning. The following is an exemplary method for determining the DOC.

The first step in the testing process is pre-soiling the porous filtration media to be tested in the wash cycle. The porous filtration media is pre-soiled under controlled conditions. For example, a filtration unit is designated for all tests and the filtration conditions are standardized for each test (equal amount and type of dirty influent, same flow rate, equal weight of porous filtration media, equal flow pressure etc.). The dirty influent, which simulates the real-world fluid to be filtered, may be prepared by dissolving a set amount of pre-engineered solid particles into a set amount of fluid (for example water) to produce a standardized dirty influent. The pre-engineered solids may have a defined particle size range to closely simulate the particle size range in the fluids to be filtered under normal operating conditions. Using the standardized dirty influent, the filtration unit is run for a pre-determined amount of time (run-time). The run-time may be set to correspond to actual times between wash cycles in normal operation, may be set to an arbitrarily determined time (for example 1 hour), or may be determined when a specific change in pressure is observed in the operation of the filtration unit (which is a surrogate for the amount of solids collected by the porous filtration media); other means to set the run-time may also be used. Before the soiling process is begun, a sample of media is extracted from the media bed, dried and weighed to determine the "Before Soiling" Weight of the Media (Before Soiling Weight). After the soiling process is completed, a sample of media is extracted from the media bed, dried and weighed to determine the "After Soiling" Weight of the Media (After Soiling Weight).

The test procedures now advance to the wash testing phase. The soiled media can be wash tested in the same physical unit used for the soiling step or the soiled media can be transferred to a unit designed specifically for wash testing; in either case, the unit is referred to as the "wash testing unit". The wash testing unit may incorporate one or both of the improvements described herein. When an entire batch of soiled media is not used in a single run, equal amounts of the soiled media are used for each wash test (for example, based on weight of the media or based on the number of individual media units). The soiled media is subjected to a wash cycle under controlled conditions. For example, potable water may be used as the PRF and the PRF used at the same pressure, flow rate and temperature in all wash tests. The wash cycle time may be varied. For certain tests, the wash cycle time is maintained as a constant between tests. In other embodiments, the wash cycle time may be varied. The wash cycle time may be determined as desired. For example, the wash cycle time may be: i) based on the length of the wash cycle under normal operating conditions (for example 30-35 minutes); ii) set to a series of pre-determined times that are less than the length of a wash cycle under normal operating conditions (for example 5 minutes, 10 minutes, 15 minutes, 20 minutes etc.); iii) set to a series of pre-determined abbreviated washing steps of purposefully selected durations (for example: a first wash segment of 3 minutes duration, a second wash segment of 4 minutes duration, a third of 8 minutes duration and a fourth of 10 minutes duration or a first wash segment of 10 minutes duration, a second wash segment of 8 minutes duration, a third of 8 minutes duration and a fourth of 8 minutes duration); iv) set to end based on a characteristic of the effluent; or v) set to end based on a parameter of the system (for example, change in pressure of the PRF). The wash cycle may use each of the improvements described herein separately and each of the improvements together. Furthermore, wash cycles may be conducted using the device of the prior art (without the improvements described herein). In addition, a stringent wash cycle using chemical agents (for example detergents) in a commercial washer may also be used to determine the maximum amount of the pre-engineered particles that can be removed from the pre-soiled media for comparison purposes (referred to as the "maximum wash").

After the completion of each wash testing step and/or after each completed wash cycle, a sample of the media is removed, dried and weighed under controlled conditions. The sample may be the entire amount of media used in the wash testing step and/or wash cycle or a portion thereof. The weight of the dried media reflects the weight of the retained particles as well as the weight of the media (referred to as the "washed weight"). As the original weight of the media that was used in the test is known, this weight may be subtracted from the washed weight if desired. Alternatively, the weight of the media may be assumed to be equal across all wash tests given the controlled conditions described above and the determined washed weight may be used directly.

The washed weight may be compared between wash cycles using the improvements, both alone and in combination, with the washed weight determined using the wash cycle of the prior art device described herein and the maximum wash as described above. For example, the washed weight for media subjected to a wash cycle using only the directed scouring improvement may be directly compared to the washed weight for media subject to a wash cycle of the prior art device. As another example, the washed weight for media subjected to a wash cycle using only the transition plenum improvement may be directly compared to the washed weight for media subject to a maximum wash. The lower the washed weight, the higher the DOC.

In another approach, the weight of particulates removed (for example in grams) is determined for each wash condition by subtracting the washed weight from the soiled weight. Therefore, the amount of particulates removed for each wash condition may be directly compared. For example, the weight of particulates removed from media subjected to a wash cycle using only the directed scouring improvement may be directly compared to the weight of particulates removed from media subject to a wash cycle of the prior art device. As another example, the weight of particulates removed from media subjected to a wash cycle using the transition plenum improvement and the directed scouring fluid improvement may be directly compared to the weight of particulates removed from media subject to the maximum wash. The greater the weight of particulates removed, the higher the DOC.

Furthermore, the percentage of maximum clean can also be determined. In such an approach, the weight of particulates removed from media subject to the maximum wash is determined as well as the weight of particulates removed from media subject to various washing conditions. For example, the weight of particulates removed from media subjected to a desired wash condition is divided by the weight of particulates removed from media subject to the maximum wash and multiplied by 100 to determine a percentage of maximum clean. For example, the percentage of maximum clean for media subjected to a wash cycle using only the transition plenum improvement may be directly compared to the percentage of maximum clean for media subject to a wash cycle of the prior art device. As another example, the percentage of maximum clean for media subjected to a wash cycle using the transition plenum improvement and the directed scouring improvement may be directly compared to the percentage of maximum clean for media subject to a wash cycle using only the directed scouring improvement. The higher the percentage of maximum clean, the higher the DOC.

In another example, the rate of change of the DOC is measured. In this approach, pre-soiled media is subject to a wash cycle using the maximum wash as described above for short intervals of time that are less than the wash cycle time normally used (for example, for 8 minutes, 16 minutes and 24 minutes) and the DOC determined for each time interval. The DOC can be measured by the percentage of maximum clean; however, other measures of DOC may be used, such as the weight of particulates removed or the washed weight if desired. The DOC for the wash can be plotted graphically with time on the x axis and, percentage of clean (or other measure of DOC) on they axis. Similarly, pre-soiled media is subject to a wash cycle using the improvements described herein, either alone or in combination and/or using the wash cycle of the prior art device described herein. The same intervals of time are chosen as used for the maximum wash test. The results for each condition are plotted graphically as described above and compared to the plot obtained for the maximum wash condition. From a comparison of the graphs, the time taken to reach a certain DOC parameter (for example, percent of maximum clean) can be determined for each wash cycle condition and the results compared. For example, the time taken to reach 50% of the specified DOC parameter or 90% of the specified DOC parameter can determined for each wash cycle condition and compared.

Example 1

Both the filtration device of the present disclosure and the prior art filtration device were tested to determine the improvement in removal of trapped solids from the compressible filtration media during the wash cycle realized using the filtration device of the present disclosure. The testing methods involved generally two steps. The first step was a "filtration" step in which the compressible filtration media (as described below) was exposed to a fluid stream containing particulate contaminants such that the compressible filtration media removed particulate contaminants from the fluid stream. As the filtration step progressed over time, the compressible filtration media captured more and more particulate contaminants from the fluid stream. At the end of the filtration step, the compressible filtration media can be referred to as "soiled," indicating that the compressible filtration media has removed a desired portion of the particulate contaminants from the fluid stream, thereby trapping the particulate contaminants within the compressible filtration media. The second step comprised subjecting the soiled compressible filtration media to a "washing" or "cleaning" step. The purpose of the washing step is to remove at least a portion of the trapped particulate contaminants from the compressible filtration media so as to prepare the compressible filtration media for subsequent rounds of filtration. As discussed herein, filtration media (regardless of type) is required to be cleaned periodically to maintain the ability to remove contaminants. The greater the degree of cleaning of the compressible filtration media (i.e., the more of the entrapped particulate contaminants are removed from the compressible filtration media) during the washing step and the length of time required to achieve a certain or desired degree of cleaning are important considerations in the washing step.

The compressible filtration media used to form the filter media bed in this example was that described in U.S. Pat. No. 7,374,676. Each compressible filtration media unit was a fibrous sphere approximately 1.25 inches in diameter manufactured from synthetic materials. Each individual compressible filtration media unit was manufactured from a large number of synthetic fibers bound together in the center of the unit by a band. The compressible filtration media units are capable of being compressed in order to adjust the porosity and the size of the particulate contaminants that are trapped. Approximately 15,000 individual compressible filtration media units were used to form the filter media bed for tests described in this example.

To determine the degree of cleaning (DOC) accomplished by the filtration devices of the prior art (sometimes referred to as the "Old Configuration" as illustrated in FIGS. 1, 2A & 2B) and the filtration devices of the present disclosure (sometimes referred to as the "New Configuration" as illustrated in FIGS. 3A to 3G and 4A to 4C), a test unit was developed that allowed the components required for the washing step in the prior art filtration devices and the filtration devices of the present disclosure to be substituted for one another while keeping the remaining components of the test unit the same.

Figure 5:
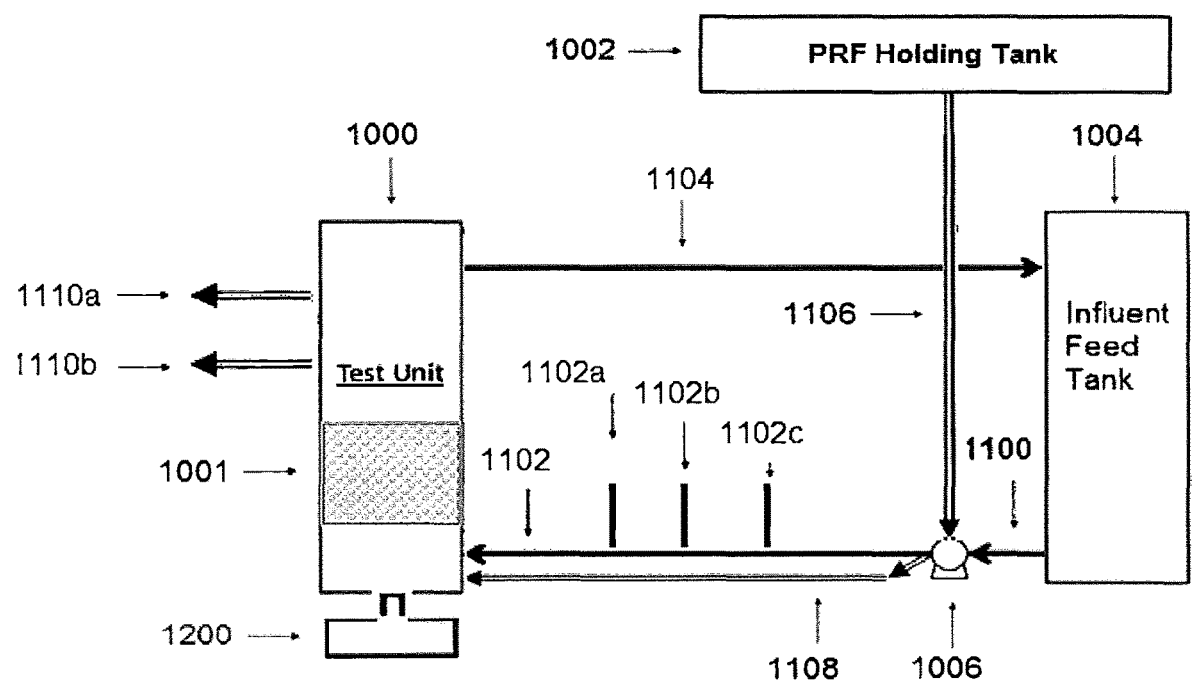
FIG. 5 shows a full scale commercial size 3 foot by 3 foot cross-sectional area filter unit constructed specifically to perform the Degree of Cleaning testing. This specially designed testing filter was designed such that it could be set-up in either the prior art configuration (the "Old" Configuration) or the improved configuration as described in the present application (the "New" Configuration).

The test unit is shown in FIG. 5. The test unit is a full scale commercial size 3 foot by 3 foot cross-sectional area filtration device constructed specifically to perform the testing as described in this Example. The operation of the test unit 1000 is now described. The test unit was operated the same for tests using the Old Configuration and the New Configuration, with the exception of the washing step as described below. FIG. 5 shows the test unit 1000 with filter media bed 1001, PRF holding tank 1002, influent feed tank 1004 and pump 1006 to drive the influent and PRF. Line 1100 is in fluid communication with the influent feed tank 1004 and the pump 1006. Line 1102 is in fluid communication with the pump 1006 and the test unit 1000 and serves to direct the influent into the test unit 1000. Line 1102 is also equipped with additive feed lines 1102a, 1102b, 1102c to allow introduction of the additive constituent components necessary to produce an influent having the characteristics of influent encountered in real-world applications. The flow rate of each of the additives is controlled during the filtration step to maintain the appropriate concentration of influent components throughout the filtration step. The additives are not added during the washing step and the additive feed lines are closed. Line 1104 is in fluid communication with the test unit 1000 and the influent feed tank 1004 and serves to recycle the effluent from the test unit back to the influent feed tank 1004 and ultimately back to the test unit through lines 1100 and 1102. Line 1104 is closed during the washing step. Line 1106 is in fluid communication with the PRF holding tank 1002 and the pump 1006 while line 1008 is in fluid communication with pump 1006 and the test unit 1000 and serves to direct the PRF into the test unit during the washing step. Line 1110a and line 1110b are each in fluid communication with the test unit 1000 and serves to remove the PRF fluid and released particulate contaminants from the test unit 1000 for collection or disposal during the wash step (they are each particle removal fluid effluent pipes). Lines 1110a and 1110b are each closed during the filtration steps. Line 1110b was used for removal of the PRF for tests using the New Configuration (and was therefore closed during the washing step in tests using the Old Configuration). Line 1110a was used for removal of the PRF for tests using the Old Configuration (and was therefore closed during the washing step in tests using the New Configuration). As discussed herein, the relative position of the upper plate to the particle removal fluid effluent pipe and the distance from the top surface of the lower plate to the bottom of the invert of the particle removal fluid effluent pipe are each factors that can be modulated to influence the creation of the transition plenum as discussed herein. Pump 1006 and the piping system are each equipped with switching valves as is known in the art to allow the direction of influent during the filtration step or PRF during the washing step as appropriate. The test unit is also equipped with various ancillary components required for operation, such as, but not limited to, a pressure sensing device to measure differential pressure across the media filter bed as described below and peristaltic pumps to control the addition of the additive constituent components necessary to produce the influent as described. The test unit 1000 further comprised a SF delivery system 1200, which is capable of being switched to allow the SF to be delivered by the methods of the prior art (the Old Configuration) and to allow the SF to be delivered by the methods of the present disclosure (the New Configuration). A blower (not shown in FIG. 5) was used to introduce the SF at the rate as described herein.

The test unit operated as described herein. Briefly, the test unit contained a filter media bed comprising the compressible filtration media units contained by the walls of the test unit, an upper and a lower plate, with the upper plate being movable with respect to the lower plate to compress the filter media bed during the filtration step and to allow the filter media bed to be expanded during the washing step. Each plate contained perforations to allow the various fluids to flow through while still retaining the compressible filtration media in the filter media bed. As discussed herein, in operation during the filtration step the compressible filtration media is compressed to define a porosity gradient in the filter media bed proceeding progressively from more porous to less porous in the direction of the flow of the influent fluid so that filtration proceeds in a direction from a more porous to a less porous filter media bed. In such operation, the larger particles are initially retained or captured in the portion of the filter media bed where the compressible filtration media have the largest pore size and smaller particles are retained or captured later in the portion of the filter media bed where the compressible media filter has smaller pore size.

For each test of the devices of the prior art (the Old Configuration) and the devices of the present disclosure (the New Configuration), a batch of new filtration media was placed in the test unit to form the filter media bed as described above. Two runs were performed using the devices of the prior art and the devices of the present disclosure. During each test, samples of the compressible filtration media were obtained from the filter media bed at the time points described below. Each sample was taken from approximately the same portion of the filter media bed through a sealable opening in the test unit using the same sampling device. From each sample taken, 20 individual compressible filtration media units were removed at random, labeled and processed as described herein. Any remaining compressible filtration media units were placed back into the filter media bed.

After creation of the filter media bed, a sample of 20 individual compressible filtration media units, identified as the "Before Soiling" Sample, was taken from the filter media bed prior to beginning the filtration step. The test unit was then placed into a filtration cycle for the purpose of "soiling" the compressible filtration media. The influent to the test unit during the filtration cycle was a fluid stream (potable water) containing particulate contaminants that was specifically engineered to significantly and visually soil the filtration media and to mimic the particulate contaminants seen in real-world operations. This real-world simulated influent was prepared by adding carefully controlled amounts of each of the following constituent additives to the potable water flowing from the PRF holding tanks to yield an influent having the concentrations of each of these additives as indicated by the values in brackets [ ]: anionic friction reducer polymer DCF-223/CT-223[0.5 ppm], pre-engineered solids ("PES") (ISO 121103-1, A4 Coarse Test Dust, [100 mg/L]) and partially digested bio-solids [25 mg/L] (extracted from a local wastewater treatment facility).

The influent entered the test unit 1000 through line 1102 and passed through the test unit at a flow rate of 135 gallons per minute, which was equivalent to 15 gallons per minute per square foot of the filter media bed cross-sectional area. During the filtration step, the effluent from the test unit 1000, which exits the test unit via line 1104, is returned to the influent feed tank 1004 in a continuously recycling manner. As described above, the additive components of the influent mixture were injected into to the recycled influent stream prior to reintroduction into the test unit 1000 throughout the filtration step.

The filtration step was continued until the differential pressure across the media filter media bed rose to the maximum operational limit. When the pressure indicator at the bottom of the test unit read 7.8 psi, the filtration step was stopped as the compressible filtration media was considered fully-soiled and at this point the filtration step was determined to be complete. A sample of 20 individual compressible filtration media units were taken and identified as the "After Soiling" Sample.

Immediately following the filtration step, the test unit was placed into the wash step for cleaning of the compressible filtration media. For all of the tests of this example, pressurized air served as the SF and potable water served as the PRF. The SF was delivered at 135 CFM and the flow rate of the PRF was set to 90 gallons per minute or 10 gallons per minute per square foot of the filter media bed cross-sectional area. The SF was delivered to the test unit though the SF delivery unit 1200, which was different in the Old Configuration versus the New Configuration as described herein. The $H_W$:$H_F$ ratio for tests using both the Old Configuration and the New Configuration was 3:33:1, with the height of the filter bed being 18 inches during the filtration step and the height of the filter bed during the washing step being 60 inches.

For the Old Configuration, the SF delivery system 1200 comprised two scouring fluid inlet pipes as shown in FIG. 2A and FIG. 2B herein (with the scouring fluid inlet pipe being designated 19 in such figures) which released the SF through exit channels (designated 19a in FIGS. 2A and 2B) disposed on the bottom portion of the scouring fluid inlet pipe (the portion of the pipe farthest away from bottom plate 7 in FIGS. 2A and 2B). As discussed herein, the SF is initially directed downwards away from the expanded compressible media filter media bed, dissipating a substantial portion of the motive force of the SF. The released SF rises and passes through perforations in lower plate of the filtration unit to agitate the expanded compressible media filter media bed. In the particular embodiment of the Old Configuration tested, two scouring fluid inlet pipes were employed, with each scouring fluid inlet pipe having 29 exit channels for release of the SF. Each scouring fluid inlet pipe was designated as either an A side or B side and the SF was introduced through the A side scouring fluid inlet pipe for two minutes followed by introduction of the SF through the B side scouring fluid inlet pipe for two minutes. This alternating procedure was repeated for a total of 34 minutes. In the configuration tested, each of the A and B side scouring fluid inlet pipe was a branched scouring fluid inlet pipe. As shown in FIG. 5, Line 1110a was used for removal of the PRF for tests using the Old Configuration. Line 1110a is located farther away from the top surface of the lower plate and farther away from the upper plate than line 1110b (which was used for the same purpose in the test unit for testing the New Configuration). The corresponding values for Z and Y (as such values are described herein) for the filtration unit operating in the Old Configuration were 83 inches and 22 inches, respectively (note that the value X does not exist in the Old Configuration as discussed herein). Due to the above-described configuration, no transition plenum was created in the tests when the test unit was in the Old Configuration.

For the New Configuration, the SF delivery system 1200 similarly comprised two scouring fluid inlet pipes (as shown in FIGS. 3A to 3C and designated 119) which released the SF through a plurality of scouring fluid nozzles (as shown in FIGS. 3A to 3C and designated 150). The scouring fluid nozzle 150 comprised a riser portion having an open first end and an open second end joined by side walls forming a passage, and a restriction point located with the riser. The second open end of each scouring fluid nozzle was placed in close proximity to a perforation in bottom plate to direct the SF through the perforation and into the compressible media filter media bed. As discussed herein, the SF is released with a jet force as it exits the scouring fluid nozzle imparting additional energy to the SF and allowing for more efficient cleaning of the compressible filtration media. In the particular embodiment of the New Configuration tested, two scouring fluid inlet pipes were employed, with each scouring fluid inlet pipe having 15 scouring fluid nozzles for release of the SF. Each scouring fluid inlet pipe was designated as either an A side or B side and the SF was introduced through the A side scouring fluid inlet pipe for two minutes followed by introduction of the SF through the B side scouring fluid inlet pipe for two minutes. This alternating procedure was repeated for a total of 34 minutes. In the configuration tested, each of the A and B side scouring fluid inlet pipe was a branched scouring fluid inlet pipe.

As shown in FIG. 5, Line 1110b was used for removal of the PRF for tests using the New Configuration. Line 1110b is located closer to the top surface of the lower plate and closer to the bottom portion of the upper plate than line 1110a (which was used for the same purpose in the test unit for testing the Old Configuration). The corresponding values for Z, Y and X (as such values are described herein) for the filtration unit operating in the New Configuration are 65 inches, 4 inches and 1 to 4 inches, respectively (the value is provided as a range for X as the individual compressible filtration media units constantly in motion due to the influence of the SF and the PRF such that a constant surface is not present). Due to the above-described configuration, a transition plenum was also created in the tests when the test unit was in the New Configuration.

At defined time intervals, the SF and the PRF were both turned-off to allow the extraction of sample of the individual compressible filtration media units (20 units). In the tests performed samples were obtained at 10 min, 18 min, 26 min, and 34 min after the initiation of the washing step.

At the end of the 34 minute washing step, the test was considered complete. Each test run yielded six (6) samples, with each sample comprising 20 units of the compressible filtration media. The samples were designated as shown below:

| | |
|---|---|
| 1). BS: Before Soiling | 2). AS: After Soiling |
| 3). 10 m: After 10 minutes of washing | 4). 18 m: After 18 minutes of washing |
| 5). 26 m: After 26 minutes of washing | 6). 34 m: After 34 minutes of washing |

Each of the six samples for each test was processed as described below and each sample was analyzed independently. Each sample comprising the 20 individual compressible filtration media units was placed in a drying pan and dried for 24 hours at 250 F. Following drying, each sample was weighed on a digital balance having an accuracy of 1/10,000 of a gram. The weight of the drying pan, which was previously determined, was subtracted from sample weight to determine the final weight of the media and the captured particles contained in the media (when present). Dividing the final as dried weight by 20 (i.e. the number of individual compressible filtration media units in the sample) yielded the average weight of the compressible filtration media units (which in samples 2 to 6 also contained varying amounts of entrapped particulate contaminants).

The metric used in determining the DOC in this example was the physical parameter of average weight of one individual compressible filtration media unit taken from the filter media bed (expressed in grams). Using statistical analysis by sampling, it can be shown that a sample of 20 individual compressible filtration media units extracted from a filter media bed composed of 15,000 individual compressible filtration media units would be sufficient to provide the accuracy need for this DOC analysis. Specifically, a sample of 20 individual compressible filtration media units removed from a filter media bed having a total of 15,000 individual compressible filtration media units yielded a confidence level of 90% with a margin of error of 16%. The average weight of each individual compressible filtration media unit (in grams) in each sample is used in the calculations below.

The primary parameter for determining the effectiveness of the washing step of the compressible filtration media in this example is the DOC. Conceptually, the DOC is simply a measure of the amount of those particulate contaminants captured by the filtration media during the filtration step that were removed during the washing step. The DOC was calculated as follows to yield a "% Clean" value:

% Clean=[("Particulate Contaminants Removed" during Washing)/("Particulate Contaminants Deposited" during filtration)]×100%

For example, when all of the Particulate Contaminants Deposited are removed from the filtration media during the washing step, the filtration media was said to be 100% Clean and the DOC=100%. Conversely, if none of the Particulate Contaminants Deposited are removed during the washing step, the filtration media was said to be 0% Clean and the DOC=0%.

The amount of Particulate Contaminants Deposited during any filtration step is determined by subtracting the weight of the filtration media before being subject to the filtration step (sample 1) from the weight of the filtration media at the end of the filtration step (sample 2). Therefore, the Particulate Contaminants Deposited=Sample 2 (AS)−Sample 1 (B S). For Example, using the values obtained for the NC #2 test, the Particulate Contaminants Deposited=3.1568−2.4068=0.75

The amount of the Particulate Contaminants Removed is calculated by subtracting the amount of retained solids in the filtration media at a particular time during the washing step (samples 3 to 5) or at the end of the washing step (sample 6) from the Particulate Contaminants Deposited value (as determined above). The amount of retained solids value is calculated by taking the weight of the filtration media at a particular time during the washing step (samples 3 to 5) or at the end of the washing step (sample 6) and subtracting the weight of the filtration media at prior to the initiation of the filtration step (sample 1). Therefore, to determine the Particulate Contaminants Removed at 10 minutes into a washing cycle, the Particulate Contaminants Removed=[Sample 2 (AS)−Sample 1 (BS)]−[Sample 3 (10 min)−Sample 1 (BS)]. Again, using the values obtained for the NC #2 test, the Particulate Contaminants Removed=[3.1568-2.4068]−[2.6646-2.4068], which on simplification equals 0.4922.

Substituting the above values into the equation above, the % Clean after 10 minutes of the washing step in NC #2=[(0.4922/0.75)]×100, which is equal to 65.6%. Therefore, for the 10 minute time point in the NC #2 test, the % clean was 65.6%.

The results of the test conducted are shown below. Two tests were conducted on the Old Configuration (OC #1 And OC #2) and two tests were conducted using the New Configuration (NC #1 And NC #2). Table 1 shows the raw average media weight data for samples 1 to 6 for OC #1, OC #2, NC #1 and NC #2 and the percent clean figure determined at the defined time intervals for OC #1, OC #2, NC #1 and NC #2.

Table 2 shows the comparison between the percent clean values obtained for the Old and New Configurations and summarizes the improvement of the percent cleaning value for the New Configuration over the Old Configuration. The percent clean data in Table 1 was averaged for the Old Configuration and New Configuration to provide the values shown in Table 2. As shown in Table 2, the average degree of cleaning obtained with the New Configuration (65.2%) in the first 10 min of washing was 34.1% greater than the average degree of cleaning obtained with the Old Configuration in the first 10 min of washing (31.1%). Surprisingly, the average degree of cleaning obtained with the New Configuration (65.2%) in the first 10 min of washing was 22.2% greater than the average degree of cleaning obtained with the Old Configuration in the entire 34 min of washing (43.0%). After completion of the washing step (34 min), the average percent clean obtained for the New Configuration (81.7%) was a 38.7% greater than the average percent clean obtained with the Old Configuration (43.0%). In addition, the average degree of cleaning obtained with the New Configuration at each time point of the washing step was 28.5 to 38.7% greater (average of 33.9% greater) than the average degree of cleaning obtained with the Old Configuration.

The data in Tables 1 and 2 clearly show that the New Configuration incorporating the improved SF delivery apparatus and transition plenum method as described herein provides for a greater DOC of filtration media. Therefore, the improved SF delivery apparatus and transition plenum method as described herein removed a higher percentage of trapped contaminant particles than the device and method of the prior art. Furthermore, using the improved SF delivery apparatus and transition plenum method as described herein allows for a dramatically reduced wash cycle time (10 min versus 34 min) while at the same time achieving significant improvements in the DOC of the filtration media. Using the device and method of the present disclosure, a wash cycle of just 10 minutes resulted in a greater DOC than that obtained with a full 34 minute wash cycle using the device and method of the prior art. Due to the greater DOC observed using the method and device of the present disclosure, the interval of time between wash cycles may be extended and the interval of time between cleaning the filtration media with chemical additives may be extended. Such results are surprising when viewed in light of the methods of the prior art.

TABLE 1

| | Degree of Cleaning as % Clean* | | | |
|---|---|---|---|---|
| Media Sample, I.D. | Test Run 1 OC #1 | Test Run 2 OC #2 | Test Run 1 NC #1 | Test Run 2 NC #2 |
| Filtration Step: | | | | |
| Before Soiling, BS (Sample 1) | 2.3195 | 2.4850 | 2.3199 | 2.4068 |
| After Soiling, AS (Sample 2) | 3.2182 | 3.0681 | 2.7562 | 3.1568 |
| Washing Step: | | | | |
| 10 min of Washing, W10 (Sample 3) | 2.8564 | 2.9398 | 2.4735 | 2.6646 |
| % Clean after 10 min of Washing | 40.3% | 22.0% | 64.8% | 65.6% |
| 18 min of Washing, W18 (Sample 4) | 2.9789 | 2.7838 | 2.4536 | 2.6843 |
| % Clean after 18 min of Washing | 26.6% | 48.8% | 69.4% | 63.0% |
| 26 min of Washing, W26 (Sample 5) | 2.8526 | 2.8288 | 2.4737 | 2.5163 |
| % Clean after 26 min of Washing | 40.7% | 41.0% | 64.7% | 85.4% |
| 34 min of Washing, W34 (Sample 6) | 2.7098 | 2.8967 | 2.3972 | 2.5483 |
| % Clean after 34 min of Washing | 56.6% | 29.4% | 82.3% | 81.1% |

*Weight expressed in grams

TABLE 2

| | | Average % Clean After "t" Minutes of Washing for the | | Average |
|---|---|---|---|---|
| Wash Duration "t" Minutes of Wash Time | Incremental Step Wash Time | Old Configuration OC Test Runs Prior Art | New Configuration NC Test Runs Improved Art | Improvement In % Cleaning At each Washing Step |
| After 10 min | 10 min | 31.1% | 65.2% | 34.1% |
| After 18 min | +8 min | 37.7% | 66.2% | 28.5% |
| After 26 min | +8 min | 40.9% | 75.1% | 34.2% |
| After 34 min | +8 min | 43.0% | 81.7% | 38.7% |
| Avg Improvement in % Cleaning per Washing Step for NC over OC = | | | | 33.9% |
| Improvement in Total Cleaning for 34 minutes full wash duration = | | | | 38.7% |

What is claimed:

1. A method for carrying out a wash cycle in a filtration device comprising a filter bed of porous filtration media units, an upper plate, a first influent pipe, a first effluent pipe and a scouring fluid inlet pipe comprising a plurality of openings on a top portion of the scouring fluid inlet pipe and a scouring fluid nozzle in communication with at least one of the openings on the scouring fluid inlet pipe, the method comprising the steps of:
   a. directing a scouring fluid from the scouring fluid nozzle into the filter bed, wherein the scouring fluid nozzles comprise a restriction point to provide a jet force to the scouring fluid;
   b. directing a particle removal fluid from the first influent pipe; and
   c. removing the particle removal fluid from the filtration unit through the first effluent pipe, wherein the first effluent pipe is located below the upper plate or located above the upper plate such that the distance from a bottom portion of the upper plate to a bottom invert on the first effluent pipe is 15 inches or less.

2. A method for carrying out a wash cycle in a filtration device comprising a filter bed of porous compressible filtration media units disposed within a housing, an upper perforated plate and a lower perforated plate at least one of which is movable, an influent pipe, and a scouring fluid inlet pipe comprising a plurality of openings on the scouring fluid inlet pipe and a plurality of scouring fluid nozzles in fluid communication with said plurality of openings on the scouring fluid inlet pipe, the method comprising the steps of:
   a. introducing a particle removal fluid from the influent pipe into said housing;
   b. expanding said filter bed by moving one of said plates;
   c. directing a scouring fluid from the scouring fluid nozzles into the particle removal fluid, wherein the scouring fluid nozzles comprise a restriction point to provide a jet force to the scouring fluid which propels individual compressible filtration units into impacts that release trapped contaminant particles from said compressible filtration media units; and
   d. removing the particle removal fluid along with released contaminant particles from the filtration device.

3. The method of claim 2, wherein the scouring fluid is compressed air.

4. The method of claim 2, further comprising an effluent pipe, wherein the particle removal fluid is removed from the filtration device through the effluent pipe and wherein the effluent pipe is located above the upper plate such that a distance from a bottom portion of the upper plate to a bottom invert on the effluent pipe is 5 inches or less.

5. The method of claim 2, further comprising an effluent pipe, wherein the particle removal fluid is removed from the filtration device through the effluent pipe and wherein the effluent pipe is located above the upper plate such that a distance from a top of the lower plate to a bottom invert on the effluent pipe is from 48 to 72 inches.

6. The method of claim 5, wherein the effluent pipe is located above the upper plate such that a distance from a bottom portion of the upper plate to a bottom invert on the effluent pipe is from 1 to 6 inches.

7. The method of claim 6, wherein the scouring fluid nozzles are positioned below the lower plate.

8. The method of claim 2, wherein a ratio of a first height of the filter bed of compressible filtration media units from a filtration cycle to a second height of the filter bed compressible filtration media units from the wash cycle is greater than or equal to 2.5:1.

9. The method of claim 2, wherein the ratio of a first height of the filter bed of compressible filtration media units from a filtration cycle to a second height of the filter bed compressible filtration media units from the wash cycle is greater than or equal to 3:1.

10. The method of claim 2, wherein a flow rate of the particle removal fluid for the wash cycle is less than 5 gpm/ft$^2$.

11. The method of claim 10, wherein a flow rate of the particle removal fluid for the wash cycle is between 5 gpm/ft$^2$ to 10 gpm/ft$^2$.

12. The method of claim 2, wherein each scouring fluid nozzle comprises a riser having an open first end and an open second end joined by side walls and forming a passage for the scouring fluid, wherein the restriction point is located at a position within the riser and the second open end is in fluid communication with at least one of the openings on the scouring fluid inlet pipe.

13. The method of claim 12, wherein the restriction point is located at or adjacent to the first open end, at or adjacent to the second open end or at a point in between the first open end and the second open end.

14. The method of claim 2, wherein steps (a), (b), and (c) are performed sequentially.

15. The method of claim 2, wherein step (a) and step (b) are performed before step (c).

16. The method of claim 2, where step (b) is performed before step (c).

17. The method of claim 2, wherein steps (a) and (b) are performed simultaneously.

18. A method for carrying out a wash cycle in a filtration device comprising:
   a. directing a scouring fluid from a scouring fluid inlet pipe comprising a plurality of openings and at least one scouring fluid nozzle in fluid communication with at least one of the openings of the scouring fluid inlet pipe into a filter bed housing containing compressible filtration media units, said filter bed housing having an upper plate and lower plate, wherein at least one of the upper plate and lower plate are moveable, and wherein said at least one scouring fluid nozzle comprises a restriction point to provide a jet force to the scouring fluid to create collisions between individual compressible filtration media units and with the filter bed housing causing captured contaminants to be released from the compressible filtration media units;
   b. directing a particle removal fluid into the filter bed housing; and
   c. removing the particle removal fluid from the filter bed housing, wherein the scouring fluid nozzle is positioned below the lower plate.

19. The method of claim 18 further comprising an effluent pipe, wherein the particle removal fluid is removed from the filter bed housing through the effluent pipe and wherein the effluent pipe is located below the upper plate or located above the upper plate such that the distance from a bottom portion of the upper plate to a bottom invert on the first effluent pipe is 15 inches or less.

20. The method of claim 19, wherein the effluent pipe is located above the upper plate such that the distance from a top of the lower plate to a bottom invert on the effluent pipe is from 48 to 72 inches.

* * * * *